(12) United States Patent
Bjorstrom et al.

(10) Patent No.: US 10,339,966 B2
(45) Date of Patent: Jul. 2, 2019

(54) MULTILAYER DISK DRIVE MOTORS HAVING OUT-OF-PLANE BENDING

(71) Applicant: Hutchinson Technology Incorporated, Hutchinson, MN (US)

(72) Inventors: Jacob D. Bjorstrom, Hutchinson, MN (US); Ryan N. Ruzicka, Waconia, MN (US); Joseph C. Wheatley, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 15/811,504

(22) Filed: Nov. 13, 2017

(65) Prior Publication Data

US 2018/0068683 A1  Mar. 8, 2018

Related U.S. Application Data

(63) Continuation of application No. 15/398,144, filed on Jan. 4, 2017, now Pat. No. 9,818,437, which is a (Continued)

(51) Int. Cl.
*G11B 5/48* (2006.01)
*G11B 5/55* (2006.01)

(52) U.S. Cl.
CPC ............ *G11B 5/483* (2015.09); *G11B 5/4833* (2013.01); *G11B 5/4853* (2013.01);
(Continued)

(58) Field of Classification Search
CPC ... G11B 5/5552; G11B 5/4873; G11B 5/4853; G11B 5/482; G11B 5/4826; G11B 5/4833; G11B 5/486
(Continued)

(56) References Cited

U.S. PATENT DOCUMENTS 3,320,556 A  5/1967  Schneider
3,582,575 A  6/1971  Scofield
(Continued)

FOREIGN PATENT DOCUMENTS

EP  0591954 B1  4/1994
EP  0834867 B1  5/2007
(Continued)

OTHER PUBLICATIONS

International Search Report and Written Opinion issued in PCT/US2013/059702, dated Mar. 28, 2014, 9 pages.
(Continued)

*Primary Examiner* — Brian E Miller
(74) *Attorney, Agent, or Firm* — Nixon Peabody LLP

(57) ABSTRACT

Various embodiments concern a gimbaled flexure having a dual stage actuation structure. The flexure comprises a gimbal on which a motor is mounted. The motor comprises a first and second terminals and a plurality of actuator layers formed from a piezoelectric material. The plurality of actuator layers comprise serially stacked first, second, and third actuator layers. The plurality of actuator layers are respectively poled and connected to the first and second terminals such that both of the first and second actuator layers expand while the third actuator layer contracts in response to application of a signal across the first and second terminals. The differential motion of the plurality of layers in the motor cause the motor to curl about the contracting third actuator layer. The curling motion causes a portion of the flexure to preferentially curl.

18 Claims, 11 Drawing Sheets

Related U.S. Application Data continuation of application No. 15/071,762, filed on Mar. 16, 2016, now Pat. No. 9,564,154, which is a continuation of application No. 14/579,063, filed on Dec. 22, 2014, now Pat. No. 9,318,136.

(52) U.S. Cl.
CPC .......... *G11B 5/4873* (2013.01); *G11B 5/4826* (2013.01); *G11B 5/5552* (2013.01)

(58) Field of Classification Search
USPC ............ 360/245, 245.3, 245.6, 264.3, 264.4, 360/264.5, 294.3, 294.4
See application file for complete search history.

(56) References Cited

U.S. PATENT DOCUMENTS

| | | |
|---|---|---|
| 3,862,522 A | 1/1975 | Mednick |
| 3,877,120 A | 4/1975 | Hikota et al. |
| 3,910,339 A | 10/1975 | Kramer |
| 4,014,257 A | 3/1977 | Bettenhausen |
| 4,168,214 A | 9/1979 | Fletcher et al. |
| 4,181,554 A | 1/1980 | Rich |
| 4,299,130 A | 11/1981 | Koneval |
| 4,418,239 A | 11/1983 | Larson et al. |
| 4,422,906 A | 12/1983 | Kobayashi |
| 4,659,438 A | 4/1987 | Kuhn et al. |
| 4,916,798 A | 4/1990 | Ballast |
| 5,140,288 A | 8/1992 | Grunwell |
| 5,189,779 A | 3/1993 | Fishel et al. |
| 5,212,847 A | 5/1993 | Melcher et al. |
| 5,275,076 A | 1/1994 | Greenwalt |
| 5,320,272 A | 6/1994 | Melton et al. |
| 5,321,568 A | 6/1994 | Hatam-Tabrizi |
| 5,333,085 A | 7/1994 | Prentice et al. |
| 5,427,848 A | 6/1995 | Baer et al. |
| 5,459,921 A | 10/1995 | Hudson et al. |
| 5,485,053 A | 1/1996 | Baz |
| 5,491,597 A | 2/1996 | Bennin et al. |
| 5,521,778 A | 5/1996 | Boutaghou et al. |
| 5,526,208 A | 6/1996 | Hatch et al. |
| 5,598,307 A | 1/1997 | Bennin |
| 5,608,590 A | 3/1997 | Ziegler et al. |
| 5,608,591 A | 3/1997 | Klaassen et al. |
| 5,631,786 A | 5/1997 | Erpelding |
| 5,636,089 A | 6/1997 | Jurgenson et al. |
| 5,651,723 A | 7/1997 | Bjornard et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,712,749 A | 1/1998 | Gustafson |
| 5,714,444 A | 2/1998 | Yokouchi et al. |
| 5,717,547 A | 2/1998 | Young |
| 5,722,142 A | 3/1998 | Myers |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,795,435 A | 8/1998 | Waters et al. |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,857,257 A | 1/1999 | Inaba |
| 5,862,010 A | 1/1999 | Simmons et al. |
| 5,862,015 A | 1/1999 | Evans et al. |
| 5,889,137 A | 3/1999 | Hutchings et al. |
| 5,892,637 A | 4/1999 | Brooks, Jr. et al. |
| 5,893,201 A | 4/1999 | Myers |
| 5,898,541 A * | 4/1999 | Boutaghou .......... G11B 5/5552 29/603.01 |
| 5,898,544 A | 4/1999 | Krinke et al. |
| 5,914,834 A | 6/1999 | Gustafson |
| 5,921,131 A | 7/1999 | Stange |
| 5,922,000 A | 7/1999 | Chodorow |
| 5,924,187 A | 7/1999 | Matz |
| 5,929,390 A | 7/1999 | Naito et al. |
| 5,956,212 A | 9/1999 | Zhu |
| 5,973,882 A | 10/1999 | Tangren |
| 5,973,884 A | 10/1999 | Hagen |
| 5,986,853 A | 11/1999 | Simmons et al. |
| 5,995,328 A | 11/1999 | Balakrishnan |
| 5,995,329 A | 11/1999 | Shiraishi et al. |
| 6,011,671 A | 1/2000 | Masse et al. |
| 6,029,334 A | 2/2000 | Hartley |
| 6,038,102 A | 3/2000 | Balakrishnan et al. |
| 6,046,887 A | 4/2000 | Uozumi et al. |
| 6,055,132 A | 4/2000 | Arya et al. |
| 6,063,228 A | 5/2000 | Sasaki et al. |
| 6,075,676 A | 6/2000 | Hiraoka et al. |
| 6,078,470 A | 6/2000 | Danielson et al. |
| 6,085,456 A | 7/2000 | Battaglia |
| 6,095,023 A | 8/2000 | Harada et al. |
| 6,108,175 A | 8/2000 | Hawwa et al. |
| 6,115,221 A | 9/2000 | Utsunomiya |
| 6,118,637 A * | 9/2000 | Wright ................. G11B 5/5552 360/245.3 |
| 6,144,531 A | 11/2000 | Sawai |
| 6,146,813 A | 11/2000 | Girard et al. |
| 6,156,982 A | 12/2000 | Dawson |
| 6,157,522 A | 12/2000 | Murphy et al. |
| 6,172,853 B1 | 1/2001 | Davis et al. |
| 6,181,520 B1 | 1/2001 | Fukuda |
| 6,195,227 B1 | 2/2001 | Fan et al. |
| 6,215,622 B1 | 4/2001 | Ruiz et al. |
| 6,215,629 B1 | 4/2001 | Kant et al. |
| 6,229,673 B1 | 5/2001 | Shinohara et al. |
| 6,233,124 B1 | 5/2001 | Budde et al. |
| 6,239,953 B1 | 5/2001 | Mei |
| 6,246,546 B1 | 6/2001 | Tangren |
| 6,246,552 B1 * | 6/2001 | Soeno ................. G11B 5/5552 360/294.4 |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,289,564 B1 * | 9/2001 | Novotny .............. G11B 5/5552 29/25.35 |
| 6,295,185 B1 | 9/2001 | Stefansky |
| 6,297,936 B1 * | 10/2001 | Kant .................... G11B 5/5552 360/294.4 |
| 6,300,846 B1 | 10/2001 | Brunker |
| 6,307,715 B1 | 10/2001 | Berding et al. |
| 6,308,483 B1 | 10/2001 | Romine |
| 6,320,730 B1 | 11/2001 | Stefansky et al. |
| 6,330,132 B1 | 12/2001 | Honda |
| 6,349,017 B1 | 2/2002 | Schott |
| 6,366,431 B1 | 4/2002 | Tsuchiya et al. |
| 6,376,964 B1 * | 4/2002 | Young ................. G11B 5/4873 310/311 |
| 6,380,483 B1 | 4/2002 | Blake |
| 6,381,821 B1 | 5/2002 | Panyon et al. |
| 6,387,111 B1 | 5/2002 | Barber |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,407,481 B1 | 6/2002 | Takeuchi et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,480,359 B1 | 11/2002 | Dunn et al. |
| 6,487,045 B1 * | 11/2002 | Yanagisawa ......... G11B 5/5552 360/236.5 |
| 6,490,228 B2 | 12/2002 | Killam |
| 6,493,190 B1 | 12/2002 | Coon |
| 6,493,192 B2 | 12/2002 | Crane et al. |
| 6,498,704 B1 | 12/2002 | Chessman et al. |

(56) References Cited

U.S. PATENT DOCUMENTS

| | | | |
|---|---|---|---|
| 6,501,625 B1 * | 12/2002 | Boismier | G11B 5/4846 |
| | | | 360/294.7 |
| 6,539,609 B2 | 4/2003 | Palmer et al. | |
| 6,549,376 B1 | 4/2003 | Scura et al. | |
| 6,549,736 B2 | 4/2003 | Miyabe et al. | |
| 6,563,676 B1 | 5/2003 | Chew et al. | |
| 6,581,262 B1 | 6/2003 | Myers | |
| 6,596,184 B1 | 7/2003 | Shum et al. | |
| 6,597,541 B2 | 7/2003 | Nishida et al. | |
| 6,600,631 B1 | 7/2003 | Berding et al. | |
| 6,621,653 B1 | 9/2003 | Schirle | |
| 6,621,658 B1 | 9/2003 | Nashif | |
| 6,636,388 B2 | 10/2003 | Stefansaky | |
| 6,639,761 B1 | 10/2003 | Boutaghou et al. | |
| 6,647,621 B1 | 11/2003 | Roen et al. | |
| 6,653,763 B2 * | 11/2003 | Wang | G11B 5/5552 |
| | | | 310/367 |
| 6,661,617 B1 | 12/2003 | Hipwell, Jr. et al. | |
| 6,661,618 B2 | 12/2003 | Fujiwara et al. | |
| 6,704,157 B2 | 3/2004 | Himes et al. | |
| 6,704,158 B2 | 3/2004 | Hawwa et al. | |
| 6,704,165 B2 | 3/2004 | Kube et al. | |
| 6,711,930 B2 | 3/2004 | Thom et al. | |
| 6,714,384 B2 | 3/2004 | Himes et al. | |
| 6,714,385 B1 | 3/2004 | Even et al. | |
| 6,724,580 B2 * | 4/2004 | Irie | G11B 5/4806 |
| | | | 310/311 |
| 6,728,057 B2 | 4/2004 | Putnam | |
| 6,728,077 B1 * | 4/2004 | Murphy | G11B 5/5552 |
| | | | 360/294.4 |
| 6,731,472 B2 | 5/2004 | Okamoto et al. | |
| 6,735,052 B2 | 5/2004 | Dunn et al. | |
| 6,735,055 B1 | 5/2004 | Crane et al. | |
| 6,737,931 B2 | 5/2004 | Amparan et al. | |
| 6,738,225 B1 | 5/2004 | Summers et al. | |
| 6,741,424 B1 | 5/2004 | Danielson et al. | |
| 6,751,062 B2 | 6/2004 | Kasajima et al. | |
| 6,752,661 B2 | 6/2004 | Gu et al. | |
| 6,760,182 B2 | 7/2004 | Bement et al. | |
| 6,760,194 B2 | 7/2004 | Shiraishi et al. | |
| 6,760,196 B1 | 7/2004 | Niu et al. | |
| 6,762,913 B1 | 7/2004 | Even et al. | |
| 6,765,761 B2 | 7/2004 | Arya | |
| 6,771,466 B2 | 8/2004 | Kasajima et al. | |
| 6,771,467 B2 | 8/2004 | Kasajima et al. | |
| 6,789,593 B1 | 9/2004 | Aono et al. | |
| 6,791,802 B2 | 9/2004 | Watanabe et al. | |
| 6,796,018 B1 | 9/2004 | Thonton | |
| 6,797,888 B2 | 9/2004 | Ookawa et al. | |
| 6,798,597 B1 | 9/2004 | Aram et al. | |
| 6,801,402 B2 | 10/2004 | Subrahmanyam et al. | |
| 6,802,496 B1 | 10/2004 | Preta | |
| 6,831,539 B1 | 12/2004 | Hipwell, Jr. et al. | |
| 6,833,978 B2 | 12/2004 | Shum et al. | |
| 6,839,204 B2 | 1/2005 | Shiraishi et al. | |
| 6,841,737 B2 | 1/2005 | Komatsubara et al. | |
| 6,856,075 B1 | 2/2005 | Houk et al. | |
| 6,859,345 B2 * | 2/2005 | Boutaghou | G11B 5/4873 |
| | | | 360/294.4 |
| 6,870,091 B2 | 3/2005 | Seidler | |
| 6,882,506 B2 | 4/2005 | Yamaoka et al. | |
| 6,891,700 B2 | 5/2005 | Shiraishi et al. | |
| 6,898,042 B2 | 5/2005 | Subrahmanyan | |
| 6,900,967 B1 | 5/2005 | Coon et al. | |
| 6,922,305 B2 | 7/2005 | Price | |
| 6,934,127 B2 | 8/2005 | Yao et al. | |
| 6,942,817 B2 | 9/2005 | Yagi et al. | |
| 6,943,991 B2 | 9/2005 | Yao et al. | |
| 6,950,288 B2 | 9/2005 | Yao et al. | |
| 6,961,221 B1 * | 11/2005 | Niu | G11B 5/4826 |
| | | | 310/311 |
| 6,963,471 B2 | 11/2005 | Arai et al. | |
| 6,975,488 B1 | 12/2005 | Kulangara et al. | |
| 6,977,790 B1 | 12/2005 | Chen et al. | |
| 7,006,333 B1 | 2/2006 | Summers | |
| 7,016,159 B1 | 3/2006 | Bjorstrom et al. | |
| 7,020,949 B2 | 4/2006 | Muramatsu et al. | |
| 7,023,667 B2 | 4/2006 | Shum | |
| 7,050,267 B2 | 5/2006 | Koh et al. | |
| 7,057,857 B1 | 6/2006 | Niu et al. | |
| 7,064,928 B2 | 6/2006 | Fu et al. | |
| 7,068,473 B2 * | 6/2006 | O'Neill | G11B 5/5552 |
| | | | 360/294.4 |
| 7,079,357 B1 | 7/2006 | Kulangara et al. | |
| 7,082,670 B2 | 8/2006 | Boismier et al. | |
| 7,092,215 B2 | 8/2006 | Someya et al. | |
| 7,099,115 B2 * | 8/2006 | Yao | G11B 5/486 |
| | | | 360/244.7 |
| 7,099,117 B1 | 8/2006 | Subrahmanyam et al. | |
| 7,129,418 B2 | 10/2006 | Aonuma et al. | |
| 7,130,159 B2 | 10/2006 | Shimizu et al. | |
| 7,132,607 B2 | 11/2006 | Yoshimi et al. | |
| 7,142,395 B2 | 11/2006 | Swanson et al. | |
| 7,144,687 B2 | 12/2006 | Fujisaki et al. | |
| 7,158,348 B2 | 1/2007 | Erpelding et al. | |
| 7,159,300 B2 | 1/2007 | Yao et al. | |
| 7,161,765 B2 | 1/2007 | Ichikawa et al. | |
| 7,161,767 B2 | 1/2007 | Hernandez et al. | |
| 7,177,119 B1 | 2/2007 | Bennin et al. | |
| 7,185,409 B1 | 3/2007 | Myers | |
| 7,218,481 B1 | 5/2007 | Bennin et al. | |
| 7,256,968 B1 | 8/2007 | Krinke | |
| 7,271,958 B2 | 9/2007 | Yoon et al. | |
| 7,283,331 B2 | 10/2007 | Oh et al. | |
| 7,288,590 B2 | 10/2007 | Lechat et al. | |
| 7,292,413 B1 | 11/2007 | Coon | |
| 7,307,817 B1 | 12/2007 | Mei | |
| 7,322,241 B2 | 1/2008 | Kai | |
| 7,336,436 B2 | 2/2008 | Sharma et al. | |
| 7,336,444 B2 | 2/2008 | Kido et al. | |
| 7,338,693 B2 | 3/2008 | Shikano et al. | |
| 7,342,750 B2 | 3/2008 | Yang et al. | |
| 7,345,851 B2 | 3/2008 | Hirano et al. | |
| 7,375,930 B2 * | 5/2008 | Yang | G11B 5/5552 |
| | | | 360/294.4 |
| 7,379,274 B2 | 5/2008 | Yao et al. | |
| 7,382,582 B1 | 6/2008 | Cuevas | |
| 7,384,531 B1 | 6/2008 | Peltoma et al. | |
| 7,385,788 B2 | 6/2008 | Kubota et al. | |
| 7,388,733 B2 | 6/2008 | Swanson et al. | |
| 7,391,594 B2 | 6/2008 | Fu et al. | |
| 7,403,357 B1 | 7/2008 | Williams | |
| 7,408,745 B2 | 8/2008 | Yao et al. | |
| 7,417,830 B1 | 8/2008 | Kulangara | |
| 7,420,778 B2 | 9/2008 | Sassine et al. | |
| 7,459,835 B1 * | 12/2008 | Mei | G11B 5/4833 |
| | | | 310/330 |
| 7,460,337 B1 | 12/2008 | Mei | |
| 7,466,520 B2 | 12/2008 | White et al. | |
| 7,499,246 B2 | 3/2009 | Nakagawa | |
| 7,509,859 B2 | 3/2009 | Kai | |
| 7,518,830 B1 | 4/2009 | Panchal et al. | |
| 7,567,410 B1 | 7/2009 | Zhang et al. | |
| 7,595,965 B1 | 9/2009 | Kulangara et al. | |
| RE40,975 E | 11/2009 | Evans et al. | |
| 7,625,654 B2 | 12/2009 | Vyas et al. | |
| 7,629,539 B2 | 12/2009 | Ishii et al. | |
| 7,636,222 B1 | 12/2009 | Dobosz et al. | |
| 7,643,252 B2 | 1/2010 | Arai et al. | |
| 7,649,254 B2 | 1/2010 | Graydon et al. | |
| 7,663,841 B2 | 2/2010 | Budde et al. | |
| 7,667,921 B2 | 2/2010 | Satoh et al. | |
| 7,675,713 B2 | 3/2010 | Ogawa et al. | |
| 7,688,552 B2 | 3/2010 | Yao et al. | |
| 7,692,899 B2 | 4/2010 | Arai et al. | |
| 7,697,237 B1 | 4/2010 | Danielson | |
| 7,701,673 B2 | 4/2010 | Wang et al. | |
| 7,701,674 B2 | 4/2010 | Arai | |
| 7,710,687 B1 | 5/2010 | Carlson et al. | |
| 7,710,688 B1 | 5/2010 | Hentges et al. | |
| 7,719,798 B2 | 5/2010 | Yao | |
| 7,724,476 B1 | 5/2010 | Bjorstrom et al. | |
| 7,724,478 B2 | 5/2010 | Deguchi et al. | |

(56) References Cited

U.S. PATENT DOCUMENTS

| | | |
|---|---|---|
| 7,751,153 B1 | 7/2010 | Kulangara et al. |
| 7,768,746 B2 | 8/2010 | Yao et al. |
| 7,782,572 B2 | 8/2010 | Pro |
| 7,804,663 B2 | 9/2010 | Hirano et al. |
| 7,813,083 B2 | 10/2010 | Guo et al. |
| 7,813,084 B1 | 10/2010 | Hentges |
| 7,821,742 B1 | 10/2010 | Mei |
| 7,826,177 B1 | 11/2010 | Zhang et al. |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,902,639 B2 | 3/2011 | Garrou et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,946,010 B1 | 5/2011 | Myers et al. |
| 7,983,008 B2 | 7/2011 | Liao et al. |
| 7,986,494 B2 | 7/2011 | Pro |
| 8,004,798 B1 | 8/2011 | Dunn |
| 8,072,708 B2 | 12/2011 | Horiuchi |
| 8,085,508 B2 * | 12/2011 | Hatch ............... G11B 5/5552 360/245.3 |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 * | 2/2012 | Shelor ............... G11B 5/4826 360/294.4 |
| 8,144,430 B2 | 3/2012 | Hentges et al. |
| 8,144,436 B2 | 3/2012 | Iriuchijima et al. |
| 8,149,542 B2 | 4/2012 | Ando et al. |
| 8,149,545 B1 * | 4/2012 | Chai ............... G11B 5/4873 360/294.3 |
| 8,151,440 B2 | 4/2012 | Tsutsumi et al. |
| 8,154,827 B2 | 4/2012 | Contreras et al. |
| 8,157,947 B2 | 4/2012 | Kim |
| 8,161,626 B2 | 4/2012 | Ikeji |
| 8,169,746 B1 | 5/2012 | Rice et al. |
| 8,174,797 B2 | 5/2012 | Iriuchijima |
| 8,189,281 B2 | 5/2012 | Alex et al. |
| 8,189,301 B2 | 5/2012 | Schreiber |
| 8,194,359 B2 | 6/2012 | Yao et al. |
| 8,199,441 B2 | 6/2012 | Nojima |
| 8,199,442 B2 | 6/2012 | Okawara et al. |
| 8,228,642 B1 | 7/2012 | Hahn et al. |
| 8,233,240 B2 | 7/2012 | Contreras et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,284,524 B2 * | 10/2012 | Meyer ............... G11B 5/4826 360/294.3 |
| 8,289,652 B2 | 10/2012 | Zambri et al. |
| 8,289,656 B1 | 10/2012 | Huber |
| 8,295,012 B1 | 10/2012 | Tian et al. |
| 8,296,929 B2 | 10/2012 | Hentges et al. |
| 8,300,362 B2 | 10/2012 | Virmani et al. |
| 8,300,363 B2 | 10/2012 | Arai et al. |
| 8,305,712 B2 | 11/2012 | Contreras et al. |
| 8,310,790 B1 | 11/2012 | Fanslau, Jr. |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,369,046 B2 | 2/2013 | Nojima |
| 8,379,349 B1 | 2/2013 | Pro et al. |
| 8,405,933 B2 | 3/2013 | Soga |
| 8,405,934 B2 | 3/2013 | Fuchino |
| 8,446,694 B1 * | 5/2013 | Tian ............... G11B 5/483 360/245 |
| 8,456,780 B1 | 6/2013 | Ruiz |
| 8,498,082 B1 | 7/2013 | Padeski et al. |
| 8,503,133 B2 | 8/2013 | Arai et al. |
| 8,508,888 B2 * | 8/2013 | Ohsawa ............... G11B 5/4833 360/234.5 |
| 8,526,142 B1 | 9/2013 | Dejkoonmak et al. |
| 8,542,465 B2 | 9/2013 | Liu et al. |
| 8,553,364 B1 | 10/2013 | Schreiber et al. |
| 8,559,137 B2 | 10/2013 | Imuta |
| 8,582,243 B2 | 11/2013 | Feng et al. |
| 8,593,764 B1 * | 11/2013 | Tian ............... G11B 5/4853 360/245.4 |
| 8,630,067 B2 | 1/2014 | Ando et al. |
| 8,634,166 B2 | 1/2014 | Ohnuki et al. |
| 8,665,565 B2 | 3/2014 | Pro et al. |
| 8,665,567 B2 | 3/2014 | Shum et al. |
| 8,675,314 B1 * | 3/2014 | Bjorstrom ............... G11B 5/482 360/245.3 |
| 8,681,456 B1 | 3/2014 | Miller et al. |
| 8,717,712 B1 | 5/2014 | Bennin et al. |
| 8,741,195 B2 | 6/2014 | Kurihara et al. |
| 8,780,503 B2 | 7/2014 | Wright et al. |
| 8,792,214 B1 | 7/2014 | Bjorstrom et al. |
| 8,834,660 B1 | 9/2014 | Scheele et al. |
| 8,885,297 B1 | 11/2014 | Bjorstrom et al. |
| 8,891,206 B2 | 11/2014 | Miller |
| 8,896,968 B2 | 11/2014 | Miller et al. |
| 8,896,969 B1 | 11/2014 | Miller et al. |
| 8,896,970 B1 | 11/2014 | Miller et al. |
| 9,007,726 B2 | 4/2015 | Bennin et al. |
| 9,036,302 B2 | 5/2015 | Bjorstrom et al. |
| 9,070,392 B1 | 6/2015 | Bjorstrom |
| 9,093,117 B2 | 7/2015 | Tobias |
| 9,117,468 B1 | 8/2015 | Zhang et al. |
| 9,147,413 B2 | 9/2015 | Miller et al. |
| 9,240,203 B2 | 1/2016 | Miller et al. |
| 9,245,555 B2 | 1/2016 | Bennin et al. |
| 9,257,139 B2 | 2/2016 | Miller |
| 9,296,188 B1 | 3/2016 | Cray et al. |
| 9,318,136 B1 * | 4/2016 | Bjorstrom ............... G11B 5/4873 |
| 9,330,697 B2 | 5/2016 | Miller et al. |
| 9,564,154 B2 * | 2/2017 | Bjorstrom ............... G11B 5/4873 |
| 9,818,437 B2 * | 11/2017 | Bjorstrom ............... G11B 5/483 |
| 2001/0001937 A1 | 5/2001 | Benes et al. |
| 2001/0012181 A1 | 8/2001 | Inoue et al. |
| 2001/0013993 A1 | 8/2001 | Coon |
| 2001/0030838 A1 | 10/2001 | Takadera et al. |
| 2001/0043443 A1 | 11/2001 | Okamoto et al. |
| 2002/0012194 A1 | 1/2002 | Inagaki et al. |
| 2002/0075606 A1 | 6/2002 | Nishida et al. |
| 2002/0118492 A1 | 8/2002 | Watanabe et al. |
| 2002/0149888 A1 | 10/2002 | Motonishi et al. |
| 2002/0159845 A1 | 10/2002 | Mikell |
| 2002/0168897 A1 | 11/2002 | Chang |
| 2002/0176209 A1 | 11/2002 | Schulz et al. |
| 2002/0178778 A1 | 12/2002 | Thom et al. |
| 2003/0011118 A1 | 1/2003 | Kasajima et al. |
| 2003/0011936 A1 | 1/2003 | Himes et al. |
| 2003/0051890 A1 | 3/2003 | Marshall |
| 2003/0053258 A1 | 3/2003 | Dunn et al. |
| 2003/0089520 A1 | 5/2003 | Ooyabu et al. |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2004/0007322 A1 | 1/2004 | Lechat et al. |
| 2004/0008449 A1 | 1/2004 | Girard |
| 2004/0027727 A1 | 2/2004 | Shimizu et al. |
| 2004/0027728 A1 | 2/2004 | Coffey et al. |
| 2004/0032093 A1 | 2/2004 | Razavi |
| 2004/0070884 A1 | 4/2004 | Someya et al. |
| 2004/0084198 A1 | 5/2004 | Seidler |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2004/0221447 A1 | 11/2004 | Ishii et al. |
| 2004/0250952 A1 | 12/2004 | Lechat et al. |
| 2004/0264056 A1 | 12/2004 | Jang et al. |
| 2005/0045914 A1 | 3/2005 | Agranat et al. |

(56) References Cited

U.S. PATENT DOCUMENTS

| | | | |
|---|---|---|---|
| 2005/0060864 A1 | 3/2005 | Nikolaidis et al. |
| 2005/0061542 A1 | 3/2005 | Aonuma et al. |
| 2005/0063097 A1 | 3/2005 | Maruyama et al. |
| 2005/0101983 A1 | 5/2005 | Loshakove et al. |
| 2005/0105217 A1 | 5/2005 | Kwon et al. |
| 2005/0117257 A1 | 6/2005 | Thaveeprungsriporn et al. |
| 2005/0180053 A1 | 8/2005 | Dovek et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0248702 A1 | 11/2006 | Nikolaidis et al. |
| 2006/0274452 A1 | 12/2006 | Arya |
| 2006/0274453 A1 | 12/2006 | Arya |
| 2006/0279880 A1 | 12/2006 | Boutaghou et al. |
| 2007/0005072 A1 | 1/2007 | Castillo et al. |
| 2007/0041123 A1 | 2/2007 | Swanson et al. |
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0024928 A1 | 1/2008 | Yang |
| 2008/0024933 A1 | 1/2008 | Yao et al. |
| 2008/0071302 A1 | 3/2008 | Castillo et al. |
| 2008/0084638 A1 | 4/2008 | Bonin |
| 2008/0124842 A1 | 5/2008 | Wang et al. |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0229842 A1 | 9/2008 | Ohtsuka et al. |
| 2008/0247131 A1 | 10/2008 | Hitomi et al. |
| 2008/0251201 A1 | 10/2008 | Sikkel et al. |
| 2008/0264557 A1 | 10/2008 | Kim |
| 2008/0272122 A1 | 11/2008 | Son |
| 2008/0273266 A1 | 11/2008 | Pro |
| 2008/0273269 A1 | 11/2008 | Pro |
| 2009/0027807 A1 | 1/2009 | Yao et al. |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0168249 A1 | 7/2009 | McCaslin et al. |
| 2009/0176120 A1 | 7/2009 | Wang |
| 2009/0183359 A1 | 7/2009 | Tsutsumi et al. |
| 2009/0190263 A1 | 7/2009 | Miura et al. |
| 2009/0244786 A1 | 10/2009 | Hatch |
| 2009/0284870 A1* | 11/2009 | Nojima .......... G11B 5/4853 360/244 |
| 2009/0294740 A1 | 12/2009 | Kurtz et al. |
| 2010/0007993 A1 | 1/2010 | Contreras et al. |
| 2010/0067151 A1 | 3/2010 | Okaware et al. |
| 2010/0073825 A1 | 3/2010 | Okawara |
| 2010/0097726 A1 | 4/2010 | Greminger et al. |
| 2010/0142081 A1 | 6/2010 | Funabashi et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195251 A1 | 8/2010 | Nojima et al. |
| 2010/0195252 A1 | 8/2010 | Kashima |
| 2010/0208390 A1 | 8/2010 | Hanya et al. |
| 2010/0208425 A1 | 8/2010 | Rapisarda |
| 2010/0220414 A1 | 9/2010 | Klarqvist et al. |
| 2010/0246071 A1* | 9/2010 | Nojima .......... G11B 5/4873 360/294.4 |
| 2010/0271735 A1 | 10/2010 | Schreiber |
| 2010/0277834 A1 | 11/2010 | Nojima |
| 2010/0290158 A1 | 11/2010 | Hanya et al. |
| 2011/0013319 A1 | 1/2011 | Soga et al. |
| 2011/0058281 A1 | 3/2011 | Arai et al. |
| 2011/0058282 A1 | 3/2011 | Fujimoto et al. |
| 2011/0096438 A1 | 4/2011 | Takada et al. |
| 2011/0096440 A1 | 4/2011 | Greminger |
| 2011/0123145 A1 | 5/2011 | Nishio |
| 2011/0141624 A1 | 6/2011 | Fuchino et al. |
| 2011/0141626 A1 | 6/2011 | Contreras et al. |
| 2011/0159767 A1 | 6/2011 | Sakurai et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2011/0299288 A1 | 12/2011 | Rapisarda |
| 2012/0000376 A1 | 1/2012 | Kurihara et al. |
| 2012/0002329 A1 | 1/2012 | Shum et al. |
| 2012/0081813 A1 | 4/2012 | Ezawa et al. |
| 2012/0081815 A1 | 4/2012 | Arai et al. |
| 2012/0087041 A1 | 4/2012 | Ohsawa |
| 2012/0099226 A1 | 4/2012 | Zambri et al. |
| 2012/0113547 A1 | 5/2012 | Sugimoto |
| 2012/0180956 A1 | 7/2012 | Kim |
| 2012/0248759 A1 | 10/2012 | Feith |
| 2012/0276232 A1 | 11/2012 | Marczyk et al. |
| 2012/0279757 A1 | 11/2012 | Ishii et al. |
| 2012/0281316 A1 | 11/2012 | Fujimoto et al. |
| 2012/0285306 A1 | 11/2012 | Weibelt |
| 2013/0020112 A1* | 1/2013 | Ohsawa .......... G11B 5/486 174/255 |
| 2013/0021698 A1 | 1/2013 | Greminger et al. |
| 2013/0047807 A1 | 2/2013 | Sotokawa et al. |
| 2013/0055561 A1 | 3/2013 | Tsutsumi et al. |
| 2013/0107488 A1 | 5/2013 | Arai |
| 2013/0176646 A1 | 7/2013 | Arai |
| 2013/0242434 A1* | 9/2013 | Bjorstrom .......... G11B 5/4873 360/234.4 |
| 2013/0242436 A1 | 9/2013 | Yonekura et al. |
| 2013/0248231 A1 | 9/2013 | Tobias |
| 2013/0265674 A1 | 10/2013 | Fanslau |
| 2013/0279042 A1 | 10/2013 | Xiong et al. |
| 2014/0022670 A1 | 1/2014 | Takikawa et al. |
| 2014/0022671 A1 | 1/2014 | Takikawa et al. |
| 2014/0022674 A1* | 1/2014 | Takikawa .......... G11B 5/483 360/244.5 |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0085754 A1 | 3/2014 | Hanya et al. |
| 2014/0085755 A1 | 3/2014 | Hanya et al. |
| 2014/0098440 A1 | 4/2014 | Miller et al. |
| 2014/0146649 A1 | 5/2014 | Bennin et al. |
| 2014/0168821 A1 | 6/2014 | Miller |
| 2014/0198412 A1 | 7/2014 | Miller et al. |
| 2014/0216221 A1 | 8/2014 | Mashima |
| 2014/0362475 A1 | 12/2014 | Bjorstrom et al. |
| 2014/0362476 A1 | 12/2014 | Miller et al. |
| 2015/0016235 A1 | 1/2015 | Bennin et al. |
| 2015/0055254 A1 | 2/2015 | Bjorstrom et al. |
| 2015/0055255 A1 | 2/2015 | Bennin et al. |
| 2015/0055256 A1 | 2/2015 | Miller |
| 2015/0062758 A1 | 3/2015 | Miller et al. |
| 2015/0162033 A1 | 6/2015 | Miller et al. |
| 2015/0194170 A1 | 7/2015 | Roen |
| 2015/0194176 A1 | 7/2015 | Scheele et al. |
| 2015/0356987 A1 | 12/2015 | Bennin et al. |
| 2016/0171995 A1 | 6/2016 | Bjorstrom |

FOREIGN PATENT DOCUMENTS

| | | |
|---|---|---|
| JP | 9198825 A | 7/1997 |
| JP | 10003632 A | 1/1998 |
| JP | 2001057039 A | 2/2001 |
| JP | 2001202731 A | 7/2001 |
| JP | 2001307442 A | 11/2001 |
| JP | 2002050140 A | 2/2002 |
| JP | 2002170607 A | 6/2002 |
| JP | 2003223771 A | 8/2003 |
| JP | 2003234549 A | 8/2003 |
| JP | 2004039056 A | 2/2004 |
| JP | 2004300489 A | 10/2004 |
| JP | 2005209336 A | 8/2005 |
| JP | 2007115864 A | 5/2007 |

(56) References Cited

FOREIGN PATENT DOCUMENTS

| JP | 2008276927 A | 11/2008 |
|---|---|---|
| JP | 2015130221 A | 7/2015 |
| JP | 2015130225 A | 7/2015 |
| WO | WO1998020485 A1 | 5/1998 |
| WO | 2014021440 A1 | 2/2014 |
| WO | WO2014190001 A1 | 11/2014 |
| WO | 2015009733 A1 | 1/2015 |
| WO | 2015027034 A2 | 2/2015 |

OTHER PUBLICATIONS

"Calculating VLSI Wiring Capacitance", Jun. 1990, IBM Technical Disclosure Bulletin, vol. 33, Issue No. 1A, 2 pages.
3M Ultra_pure Viscoelastic Damping Polymer 242NRO1, Technical Data, Mar. 2012, 4 pages.
Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).
Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.
Harris, N.R. et al., "A Multilayer Thick-film PZT Actuator for MEMs Applications", Sensors and Actuators A: Physical, vol. 132, No. 1, Nov. 8, 2006, pp. 311-316.
Hentges, Reed T. et al., "Exploring Low Loss Suspension Interconnects for High Data Rates in Hard Disk Drives", IEEE Transactions on Magnetics, vol. 44, No. 1, Jan. 2008, pp. 169-174.
International Preliminary Examination Report issued in PCT/US2013/075320, completed Jun. 23, 2015, 7 pages.
International Preliminary Report on Patentability issued in PCT/US2013/052885, completed Mar. 3, 2015, 10 pages.
International Preliminary Report on Patentability issued in PCT/US2013/059702, completed Mar. 17, 2015, 6 pages.
International Preliminary Report on Patentability issued in PCT/US2014/038894, dated Dec. 3, 2015, 6 pages.
International Preliminary Report on Patentability issued in PCT/US2014/046714, dated Jan. 28, 2016, 8 pages.
International Preliminary Report on Patentability issued in PCT/US2014/047356, dated Feb. 4, 2016, 9 pages.
International Preliminary Report on Patentability issued in PCT/US2014/052042, dated Mar. 3, 2016, 7 pages.
International Search Report and Written Opinion issued in PCT/US13/75320, dated May 20, 2014, 10 pages.
International Search Report and Written Opinion issued in PCT/US2013/031484, dated May 30, 2013, 13 pages.
International Search Report and Written Opinion issued in PCT/US2013/033341, dated Jun. 14, 2013, 9 pages.
International Search Report and Written Opinion issued in PCT/US2013/052885, dated Feb. 7, 2014, 13 pages.
International Search Report and Written Opinion issued in PCT/US2013/052885, dated Feb. 7, 2014, 16 pages.
International Search Report and Written Opinion issued in PCT/US2013/064314, dated Apr. 18, 2014, 10 pages.
International Search Report and Written Opinion issued in PCT/US2014/046714, dated Jul. 15, 2014, 26 pages.
International Search Report and Written Opinion issued in PCT/US2014/052042, dated Mar. 13, 2015, 10 pages.
Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).
Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. of SPIE vol. 6529.
Lengert, David et al., "Design of suspension-based and collocated dual stage actuated suspensions", Microsyst Technol (2012) 18:1615-1622.
Li, Longqiu et al., "An experimental study of the dimple-gimbal interface in a hard disk drive", Microsyst Technol (2011) 17:863-868.
Pichonat, Tristan et al., "Recent developments in MEMS-based miniature fuel cells", Microsyst Technol (2007) 13:1671-1678.
Pozar, David M. Microwave Engineering, 4th Edition, copyright 2012 by John Wiley & Sons, Inc., pp. 422-426.
Raeymaekers, B. et al., "Investigation of fretting wear at the dimple/gimbal interface in a hard disk drive suspension", Wear, vol. 268, Issues 11-12, May 12, 2010, pp. 1347-1353.
Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.
Rajagopal, Indira et al., "Gold Plating of Critical Components for Space Applications: Challenges and Solutions", Gold Bull., 1992, 25(2), pp. 55-66.
U.S. Appl. No. 13/365,443 to Miller, Mark A., entitled Elongated Trace Tethers for Disk Drive Head Suspension Flexures, filed Feb. 3, 2012.
U.S. Appl. No. 13/690,883 to Tobias, Kyle T. et al., entitled Microstructure Patterned Surfaces for Integrated Lead Head Suspensions, filed Nov. 30, 2012.
U.S. Appl. No. 13/827,622 to Bjorstrom, Jacob D. et al., entitled Mid-Loadbeam Dual Stage Actuated (DSA) Disk Drive Head Suspension, filed Mar. 14, 2013.
U.S. Appl. No. 14/056,481 entitled Two-Motor Co-Located Gimbal-Based Dual Stage Actuation Disk Drive Suspensions With Motor Stiffeners, filed Oct. 17, 2013.
U.S. Appl. No. 14/103,955 to Bjorstrom, Jacob D. et al., entitled Electrical Contacts to Motors in Dual Stage Actuated Suspensions, filed Dec. 12, 2013.
U.S. Appl. No. 14/141,617 to Bennin, Jeffry S. et al., entitled Disk Drive Suspension Assembly Having a Partially Flangeless Load Point Dimple, filed Dec. 27, 2013, 53 pages.
U.S. Appl. No. 14/145,515 to Miller, Mark A. et al., entitled Balanced Co-Located Gimbal-Based Dual Stage Actuation Disk Drive Suspensions, filed Dec. 31, 2013, 39 pages.
U.S. Appl. No. 14/163,279 to Roen, Michael E. entitled Stepped Impedance Flexure Design in a Hard Disk Drive, filed Jan. 24, 2014.
U.S. Appl. No. 14/216,288 to Miller, Mark A. et al., entitled Co-Located Gimbal-Based Dual Stage Actuation Disk Drive Suspension, filed Mar. 17, 2014, 84 pages.
U.S. Appl. No. 61/396,239 entitled Low Resistance Ground Joints for Dual Stage Actuation Disk Drive Suspensions, filed May 24, 2010, 16 pages.
U.S. Appl. No. 13/114,212, filed May 24, 2011, (23 pages).
U.S. Appl. No. 61/396,239, filed May 24, 2010, (16 pages).
U.S. Appl. No. 13/972,137, filed Aug. 21, 2013.
U.S. Appl. No. 14/026,427, filed Sep. 13, 2013.
U.S. Appl. No. 14/050,660, filed Oct. 10, 2013.
U.S. Appl. No. 14/216,288, filed Sep. 14, 2012.
U.S. Appl. No. 14/467,582, filed Oct. 10, 2012.
U.S. Appl. No. 14/572,263, filed Dec. 16, 2014.
U.S. Appl. No. 14/579,063, filed Dec. 22, 2014.
U.S. Appl. No. 13/955,204 to Bjorstrom, Jacob D. et al., entitled Damped Dual Stage Actuation Disk Drive Suspensions, filed Jul. 31, 2013.
U.S. Appl. No. 13/955,204, to Bjorstrom, Jacob D. et al., Non-Final Office Action dated Mar. 24, 2014, 7 pages.
U.S. Appl. No. 13/955,204, to Bjorstrom, Jacob D. et al., Non-Final Office Action dated Oct. 29, 2013, 9 pages.
U.S. Appl. No. 13/955,204, to Bjorstrom, Jacob D. et al., Notice of Allowance dated Jan. 7, 2014, 6 pages.
U.S. Appl. No. 13/955,204, to Bjorstrom, Jacob D. et al., Notice of Allowance dated May 6, 2014, 5 pages.
U.S. Appl. No. 13/955,204, to Bjorstrom, Jacob D. et al., Response filed Apr. 18, 2014 to Non-Final Office Action dated Mar. 24, 2014, 9 pages.

(56) References Cited

OTHER PUBLICATIONS

U.S. Appl. No. 13/955,204, to Bjorstrom, Jacob D. et al., Response filed Nov. 19, 2013 to Non-Final Office Action dated Oct. 29, 2013, 11 pages.
U.S. Appl. No. 13/972,137 to Bjorstrom, Jacob D. et al., entitled Co-Located Gimbal-Based Dual Stage Actuation Disk Drive Suspensions With Offset Motors, filed Aug. 21, 2013.
U.S. Appl. No. 13/972,137, to Bjorstrom, Jacob D. et al., Non-Final Office Action dated Nov. 5, 2013.
U.S. Appl. No. 13/972,137, to Bjorstrom, Jacob D. et al., Notice of Allowance dated Jan. 17, 2014, 5 pages.
U.S. Appl. No. 13/972,137, to Bjorstrom, Jacob D. et al., Response filed Dec. 2, 2013 to Non-Final Office Action dated Nov. 5, 2013, 12 pages.
U.S. Appl. No. 14/026,427 to Miller, Mark A., entitled Co-Located Gimbal-Based Dual Stage Actuation Disk Drive Suspensions, filed Sep. 13, 2013.
U.S. Appl. No. 14/044,238 to Miller, Mark A., entitled Co-Located Gimbal-Based Dual Stage Actuation Disk Drive Suspensions With Motor Stifeners, filed Oct. 2, 2013.
U.S. Appl. No. 14/044,238 to Miller, Mark A., Non-Final Office Action dated Feb. 6, 2014, 9 pages.
U.S. Appl. No. 14/044,238, to Miller, Mark A., Response filed Apr. 22, 2014 to Non-Final Office Action dated Feb. 6, 2014, 11 pages.
U.S. Appl. No. 14/050,660 to Miller, Mark A. et al., entitled Co-Located Gimbal-Based Dual Stage Actuation Disk Drive Suspensions With Dampers, filed Oct. 10, 2013.
U.S. Appl. No. 14/050,660, to Miller, Mark A. et al., Non-Final Office Action dated Mar. 31, 2014, 9 pages.
U.S. Appl. No. 14/146,760 to Roen, Michael E. entitled Balanced Multi-Trace Transmission in a Hard Disk Drive Flexure, filed Jan. 3, 2014, 32 pages.
U.S. Appl. No. 14/215,663 to Bjorstrom, Jacob D., entitled Co-Located Gimbal-Based Dual Stage Actuation Disk Drive Suspensions With Offset Motors, filed Mar. 17, 2014.
U.S. Appl. No. 14/270,070 to Bennin, Jeffry S. et al., entitled Disk Drive Suspension Assembly Having a Partially Flangeless Load Point Dimple, filed May 5, 2014.
U.S. Appl. No. 14/335,967 to Bjorstrom, Jacob D. et al., entitled Electrical Contacts to Motors in Dual Stage Actuated Suspensions, filed Jul. 21, 2014.
U.S. Appl. No. 14/467,543 to Bjorstrom, Jacob D. et al., entitled Damped Dual Stage Actuation Disk Drive Suspensions, filed Aug. 25, 2014.
U.S. Appl. No. 14/467,582 to Miller, Mark A. et al., entitled Co-Located Gimbal-Based Dual Stage Actuation Disk Drive Suspensions With Dampers, filed Aug. 25, 2014.
Yoon, Wonseok et al., "Evaluation of coated metallic bipolar plates for polymer electrolyte membrane fuel cells", The Journal of Power Sources, vol. 179, No. 1, Apr. 15, 2008, pp. 265-273.

* cited by examiner

MULTILAYER DISK DRIVE MOTORS HAVING OUT-OF-PLANE BENDING

CROSS REFERENCE TO RELATED APPLICATIONS

This application is a Continuation of U.S. patent application Ser. No. 15/398,144 filed Jan. 4, 2017, entitled MULTILAYER DISK DRIVE MOTORS HAVING OUT-OF-PLANE BENDING, now U.S. Pat. No. 9,818,437, granted Nov. 14, 2017, which is a Continuation of U.S. patent application Ser. No. 15/071,762, filed Mar. 16, 2016, entitled MULTILAYER DISK DRIVE MOTORS HAVING OUT-OF-PLANE BENDING, now U.S. Pat. No. 9,564,154, granted Feb. 7, 2017, which is a Continuation of U.S. patent application Ser. No. 14/579,063 filed Dec. 22, 2014, entitled MULTILAYER DISK DRIVE MOTORS HAVING OUT-OF-PLANE BENDING, now U.S. Pat. No. 9,318,136, granted on Apr. 19, 2016, all of which are incorporated herein by reference in their entireties and for all purposes.

TECHNICAL FIELD

The present invention relates to disk drives and suspensions for disk drives. In particular, the invention is a dual stage actuation (DSA) suspension having a multilayered motor.

BACKGROUND

Dual stage actuation (DSA) disk drive head suspensions and disk drives incorporating DSA suspensions are generally known and commercially available. For example, DSA suspensions having an actuation structure on the baseplate or other mounting portion of the suspension, i.e., proximal to the spring or hinge region of the suspension, are described in U.S. Patent Publication No. 2010/0067151 to Okawara, U.S. Patent Publication No. 2012/0002329 to Shum, U.S. Patent Publication No. 2011/0242708 to Fuchino, and U.S. Pat. No. 5,714,444 to Imamura. DSA suspensions having actuation structures located on the loadbeam or gimbal portions of the suspension, i.e., distal to the spring or hinge region, are also known and disclosed, for example, in U.S. Pat. No. 5,657,188 to Jurgenson, U.S. Pat. No. 7,256,968 to Krinke, and U.S. Patent Publication No. 2008/0144225 to Yao. Co-located gimbal-based DSA suspensions are disclosed U.S. Pat. No. 8,681,456 to Miller, U.S. Pat. No. 8,891,206 to Miller, and U.S. Patent Publication No. 2014/0098440 to Miller. Each of the above-identified patents and patent applications is incorporated herein by reference in its entirety for all purposes.

There remains a continuing need for improved performance of DSA suspensions.

SUMMARY

Various embodiments concern a gimbaled flexure having a dual stage actuation structure. The flexure comprises a gimbal on which a motor is mounted. The motor comprises a first and second terminals and a plurality of actuator layers formed from a piezoelectric material. The plurality of actuator layers comprise serially stacked first, second, and third actuator layers. The plurality of actuator layers are respectively poled and connected to the first and second terminals such that both of the first and second actuator layers expand while the third actuator layer contracts in response to application of a signal across the first and second terminals. The differential motion of the plurality of layers in the motor cause the motor to curl about the contracting third actuator layer. The curling motion causes a portion of the flexure to preferentially curl.

Various embodiments concern a suspension structure comprising a flexure comprising a gimbal and a motor mounted on the gimbal. The motor comprises a first and second terminals, a plurality of actuator layers, and a plurality of conductive layers. The plurality of actuator layers are formed from a piezoelectric material. The plurality of actuator layers comprise a first actuator layer, a second actuator layer, and a third actuator layer. The plurality of conductive layers comprise a first conductive layer disposed along a top side of the first actuator layer, a second conductive layer between and in contact with the first actuator layer and the middle actuator layer, a third conductive layer between and in contact with the second actuator layer and the third actuator layer, and a fourth conductive layer disposed along a bottom side of the third actuator layer. The first and third conductive layers are directly connected to the second terminal and the second and fourth conductive layers are directly connected to the first terminal. The first and second layers are both poled in a first orientation and the third layer is poled in a second orientation different from the first orientation. The plurality of actuator layers are respectively poled and connected to the first and second terminals such that both of the first and second actuator layers one of expand or contract while the third actuator layer the other of expands or contracts in response to application of a signal having a first polarity across the first and second terminals, and further both of the second and third actuator layers one of expand or contract while the first actuator layer the other of expands or contracts in response to application of the signal having a second polarity that is different from the first polarity across the first and second terminals.

Various embodiments concern a suspension structure comprising a flexure and a motor mounted on the flexure. The motor comprises a first terminal, a second terminal, a first actuator layer, and a second actuator layer. Each of the first and second actuator layers are formed from piezoelectric material. The first and second actuator layers together comprise the only piezoelectric material of the motor. The first and second actuator layers are adjacent to one another. The pair of actuator layers are respectively poled and connected to the first and second terminals such that the first actuator layer one of expands or contracts while the second actuator layer the other of expands or contracts in response to application of a signal having a first polarity across the first and second terminals. The first and second actuator layers can be poled in the same orientation. The motor can comprise a first conductor layer, a second conductive layer, and a third conductive layer that are interleaved with the first and second actuator layers.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

While multiple embodiments are disclosed, still other embodiments within the scope of the present disclosure will become apparent to those skilled in the art from the following detailed description, which shows and describes illustrative embodiments. Accordingly, the drawings and detailed description are to be regarded as illustrative in nature and not restrictive.

DESCRIPTION OF THE INVENTION

Figure 1:
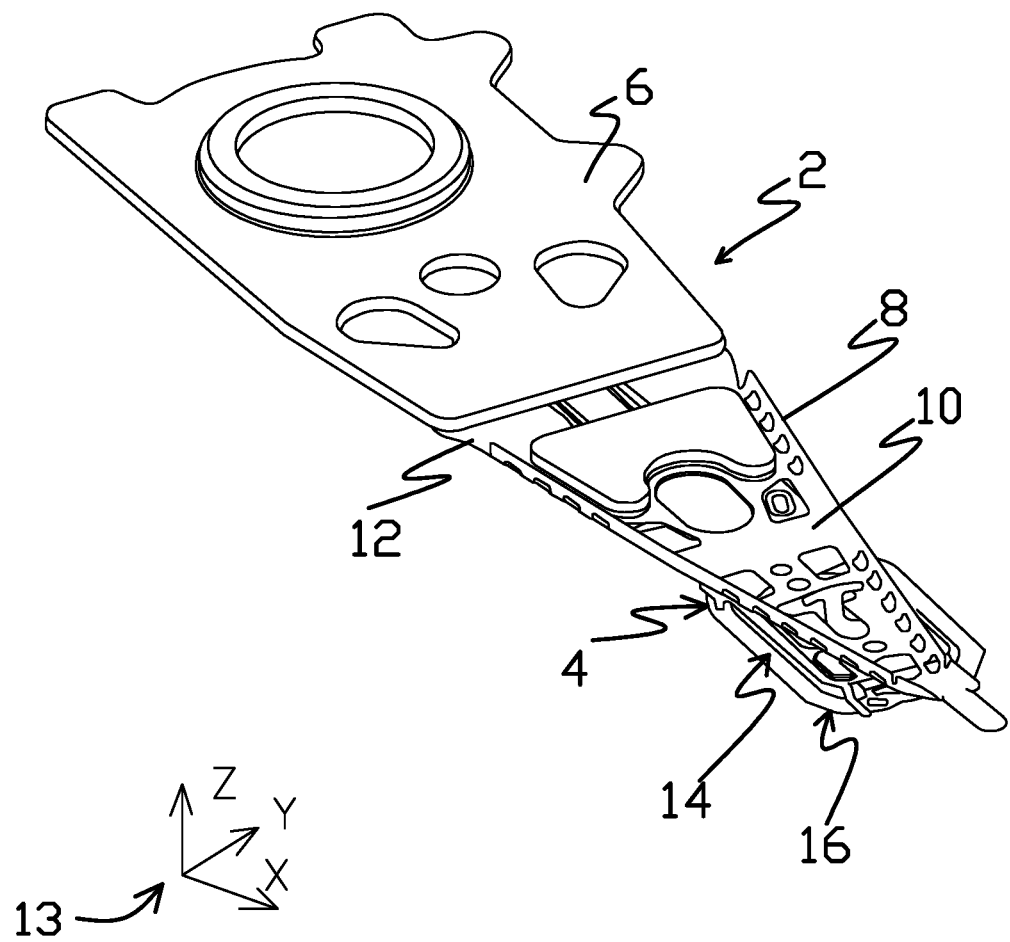
FIG. 1 is a perspective view of the loadbeam side of a suspension having a flexure with a dual stage actuation (DSA) structure.

FIG. 1 is a perspective view of the loadbeam side of a suspension 2 having a flexure 4 with a co-located or gimbal-based dual stage actuation (DSA) structure. As shown in FIG. 1, the suspension 2 includes a baseplate 6 as a proximal mounting structure. The suspension 2 includes a loadbeam 8 having a rigid or beam region 10 coupled to the baseplate 6 along a spring or hinge region 12. The loadbeam 8 can be formed from stainless steel. The flexure 4 includes a gimbal 14 at the distal end of the flexure 4. A DSA structure 16 is located on the gimbal 14, adjacent the distal end of the loadbeam 8. Proximal and distal, as used herein, refers to the relative direction along the longitudinal axis of the suspension 2. For example, the baseplate 6 is proximal of the loadbeam 8. An axes key 13 indicates X, Y, and Z axes in FIG. 1 and in subsequent FIGS. The suspension 2 is generally elongated along the X axis in distal and proximal directions. The Y axis represents lateral left and right directions. The suspension 2, including the flexure 4, are generally co-planar with an X-Y plane defined by the X and Y axes. The Z axis represents height as well as bottom and top orientations.

Figure 2:
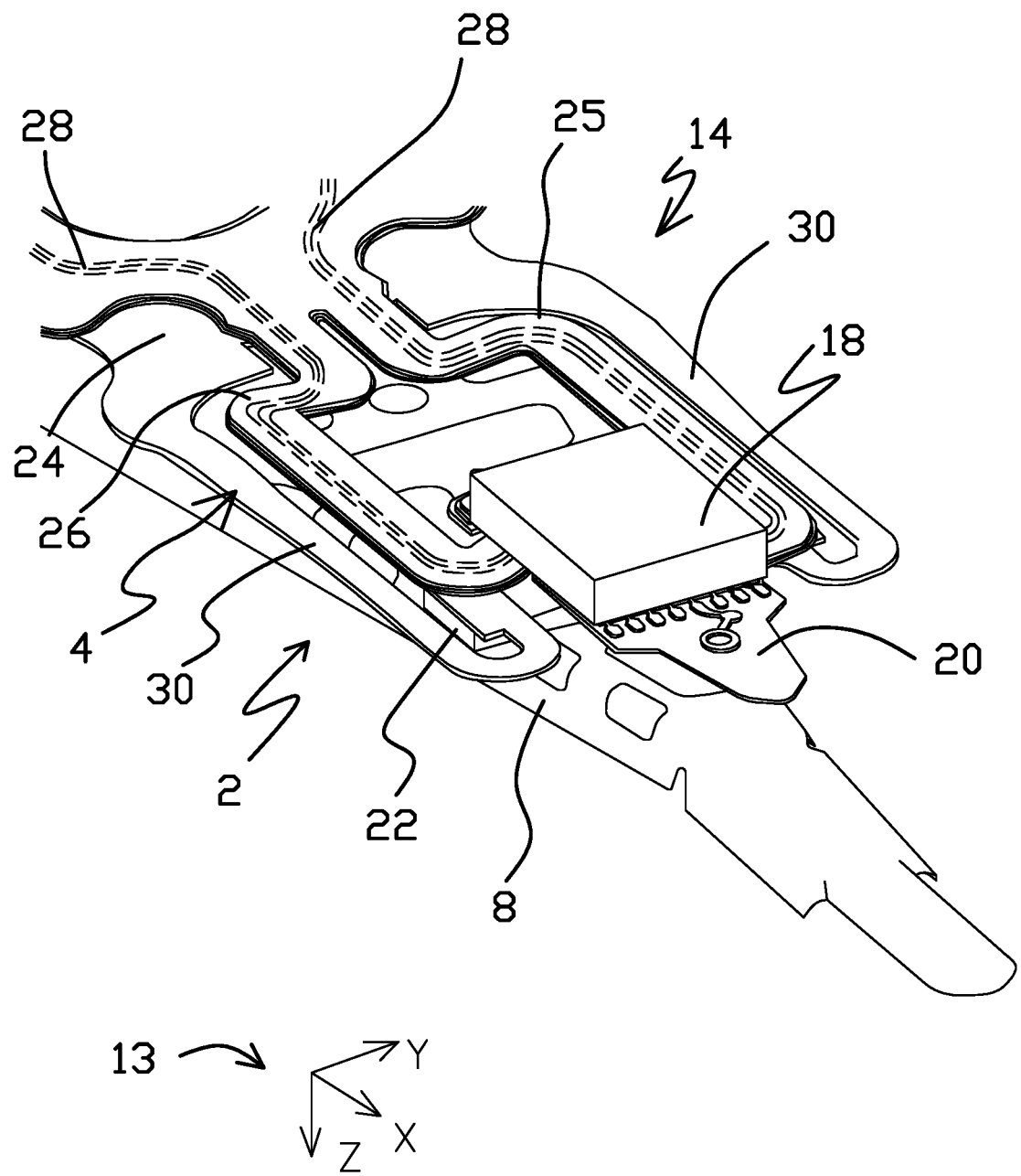
FIG. 2 is a perspective view of the flexure side (i.e., the side opposite that shown in FIG. 1) of the distal end of the suspension shown in FIG. 1.

FIG. 2 is a detailed perspective view of the flexure side of the distal end of the suspension 2. FIG. 2 shows the opposite side of the suspension 2 relative to FIG. 1. A head slider 18 is mounted to a tongue 20 of the gimbal 14, on the side of the suspension 2 that is opposite the loadbeam 8. The slider 18 is mounted to a slider mounting region of the tongue 20. The slider mounting is a surface of the tongue 20 to which the slider 18 (or component to which the slider 18 is attached) can be attached, such as with an adhesive such as epoxy. It will be understood that the slider 18 can be attached to a different portion of the gimbal 14. FIG. 2 further shows a motor 22 mounted on the gimbal 14.

The flexure 4 is composed of several layers, as is known in the art. The flexure 4 includes a stainless steel layer 24. The stainless steel layer 24 can serve as a structural backbone to the flexure 4. Metals other than stainless steel can be used. The stainless steel layer 24 can include spring arms 30. The stainless steel layer 24 can further include a tongue 20. The tongue 20 can be supported by the spring arms 30. For example, struts 3 formed from the stainless steel layer 24 can bridge between the pair of spring arms 30 and the tongue 20 located there between.

The flexure 4 includes a trace portion 26. The trace portion 26 can be located partially on the stainless steel layer 24 and can extend off of the stainless steel layer 24 at various locations, such as in a flying lead segment. The trace portion 26 can comprise a plurality of traces 28 insulated by one or more dielectric layers 25. The traces 28 can be formed from copper or another conductive material. The dielectric layers 25 can be formed from polyimide or another polymer. The traces 28 can electrically connect proximally with control circuitry of a disk drive as in known in the art. The traces 28 can electrically connect distally to various components, such as the motor 22. The slider 18 can be electrically connected with one or more of the traces 28 for transmitting read and write signal along the suspension 2.

Figure 3:
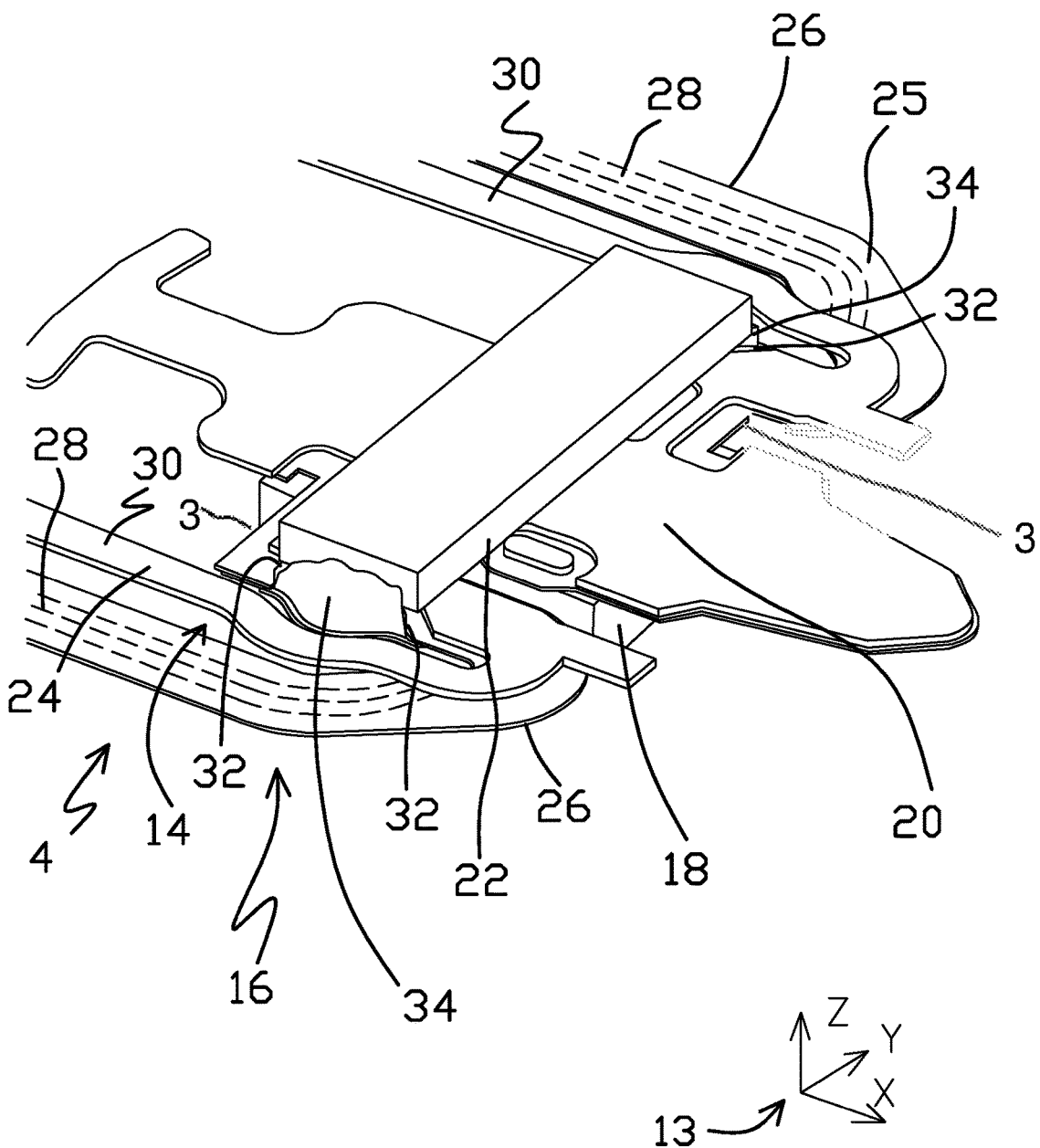
FIG. 3 is a perspective view of the stainless steel side of the distal end of a flexure with parts of the suspension removed from view to highlight the DSA structure having a motor.

FIG. 3 is a perspective view of the stainless steel side of the distal end of a flexure 4 with parts of the suspension 2 removed from view to highlight the DSA structure 16. The DSA structure 16 includes the motor 22 mounted to the gimbal 14 of the flexure 4 between the loadbeam 8 (not shown in FIG. 3) and the head slider 18. As described in greater detail below, in response to electrical drive signals applied to the motor 22, the motor 22 drives portions of the gimbal 14, including the tongue 20 and slider 18, about a generally transverse tracking axis.

The connectors 34 attach the motor 22 to the flexure 4. Specifically, the pair of connectors 34 connect the lateral ends of the motor 22 to terminal pads 32 respectively located on the pair of spring arms 30. Lateral, as used herein, refers to the left and/or right directions orthogonal to the longitudinal axis of the suspension 2. The terminal pads 32 can be formed from metal (e.g., copper) and are exposed though the dielectric layer 25 of the flexure 4 to provide access for connectors 34 to make electrical connections with the traces 28. The connectors 34 can connect with respective anode and cathode terminals of the motor 22. Connectors 34 also mechanically support the motor 22 on the flexure 4. The connectors 34 can comprise solder, conductive epoxy (e.g., silver filled), or other material for forming an electrode connection.

In FIG. 3, the motor 22 is in a neutral, undriven state in which no tracking drive signal is applied to the motor 22. It is noted that the motor 22 in FIG. 3 has a planar profile along the X-Y plane (i.e. extending along proximal-distal and lateral axes). While the thickness of the motor 22 is measured along the Z axis (presenting height), the profile of the motor 22 is essentially entirely along the X-Y plane when in the neutral, undriven state. Rotation of the tongue 20 by actuation of the motor 22 rotates the slider mounting, and thereby the slider 18, about a tracking axis, as demonstrated in FIGS. 4 and 5 and further discussed herein.

Figure 4:
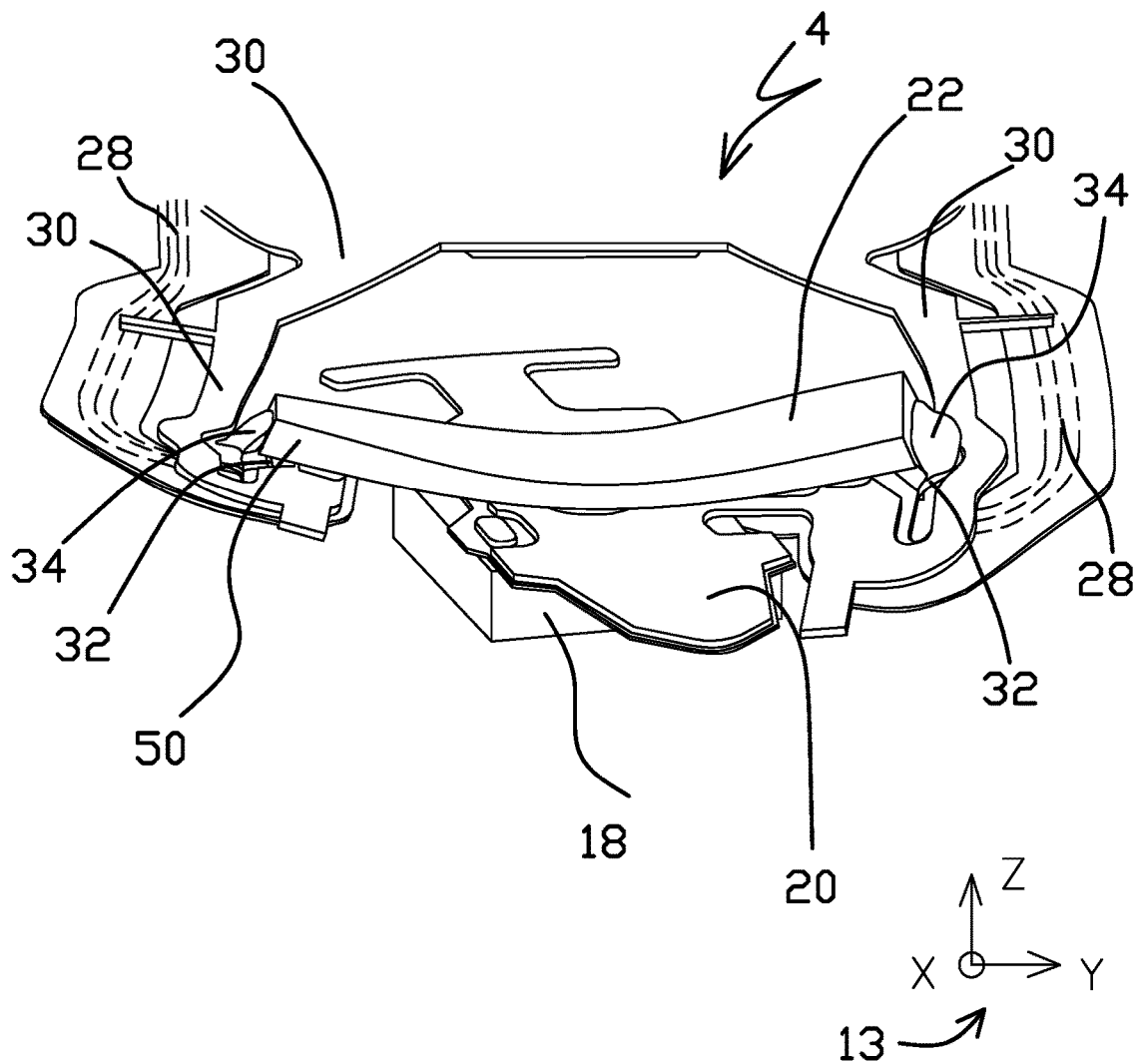
FIG. 4 shows the same view of FIG. 3 but with the motor articulating the DSA structure in a first direction.

FIG. 4 is a perspective view of the flexure 4 when the motor 22 is electrically activated to expand. In FIG. 4, a first drive signal is applied across the motor 22 via the traces 28 and connectors 34. The first drive signal (e.g., having a first polarity) causes the shape of the motor 22 to change. More specifically, the length of the motor 22 generally expands (e.g., along the Y axis). The expansion of the motor 22 mechanically causes the tongue 20, and the slider 18 mounted thereon, to deflect in a first direction about an axis of rotation. The axis of rotation is generally parallel with the Z axis. As shown, the motor 22 exhibits some out-of-plane (e.g., X-Y) motion (e.g., along the Z axis) upon the application of the first drive signal. More specifically, the motor 22 curls away from the flexure 4 when the motor 22 expands such that the lateral ends of the motor 22 move away from the slider 18 and the stainless steel layer 24 relative to the middle of the motor 22. The curling motion of the motor 22 means that the motor 22 is bending out of the X-Y plane and deflects along the Z axis.

Figure 5:
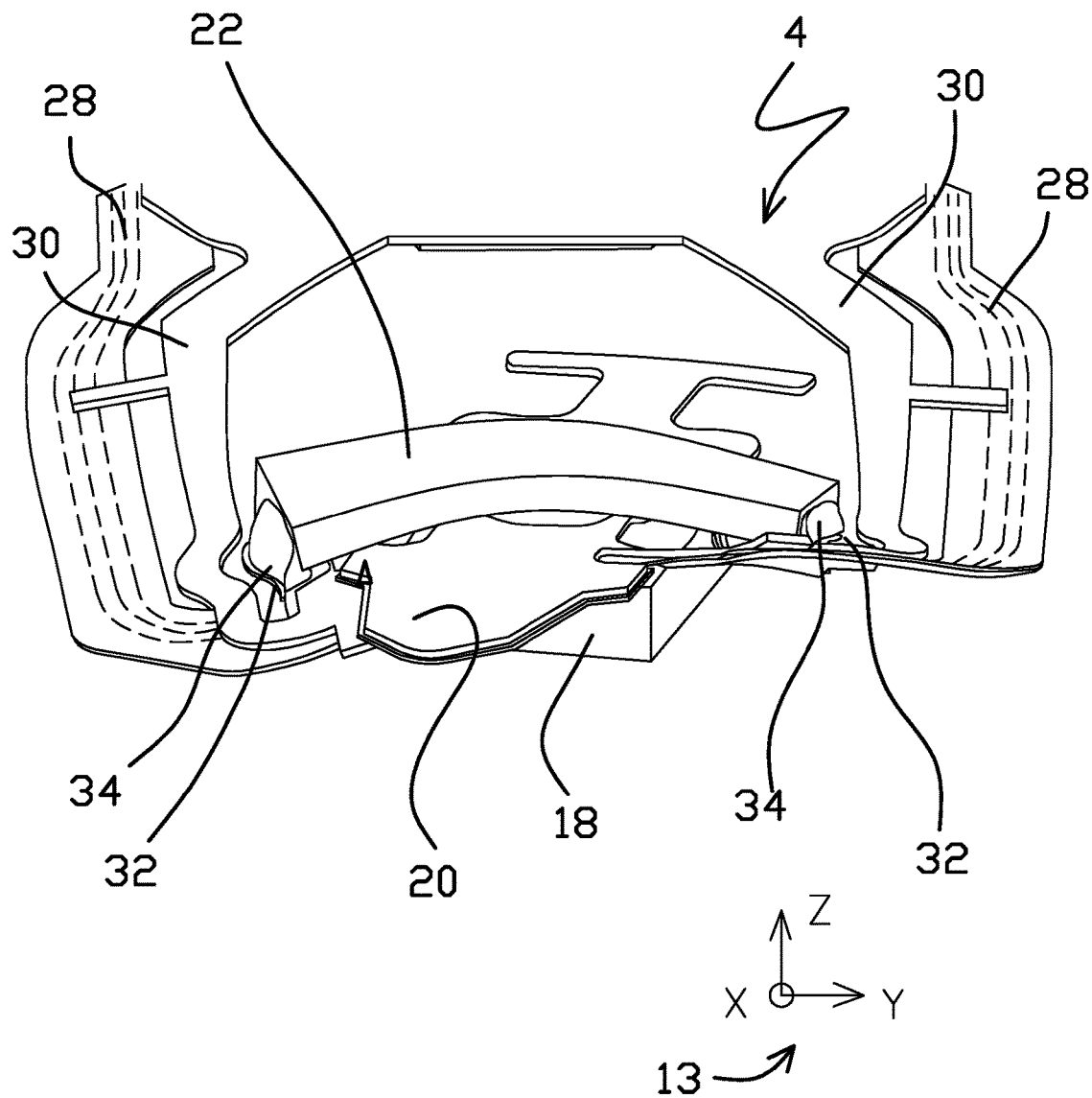
FIG. 5 shows the same view of FIGS. 3 and 4 but with the motor articulating the DSA structure in a second direction.

FIG. 5 is the same perspective view of the flexure 4 as FIG. 4 except that in FIG. 5 the motor 22 is electrically activated to generally contract. The contraction is caused by application of a second drive signal (e.g., having a second polarity opposite the first polarity) across the motor 22 via the traces 28 and connectors 34. The contraction of the motor 22 mechanically causes the tongue 20, and the slider 18 mounted thereon, to deflect in a second direction about the axis of rotation, the second direction opposite the first direction. As shown, the motor 22 exhibits some out-of-plane motion along the Z-axis upon the application of the second drive signal. More specifically, the motor 22 curls toward the flexure 4 during contraction such that the lateral ends of the motor 22 move toward the slider 18 and the stainless steel layer 24 relative to the middle of the motor 22 which moves away the slider 18 and the stainless steel layer 24. The curling of the motor 22 causes the flexure 4 to curls in the same manner. This curling of the flexure 4 can be advantageous because the curling causes more total motion in the flexure 4. Such motion can be converted into rotation of the slider 18, which provides greater total stroke for articulation of the DSA structure 16. Out-of-plane Z-axis motion (curling) and in plane X or Y motion (stretching/contracting) of the motor 22 can both be used to move the flexure 4 and rotate the slider 18. There are various motor configurations that can support the curling profiles of FIGS. 4 and 5, as further discussed herein.

Figure 6:
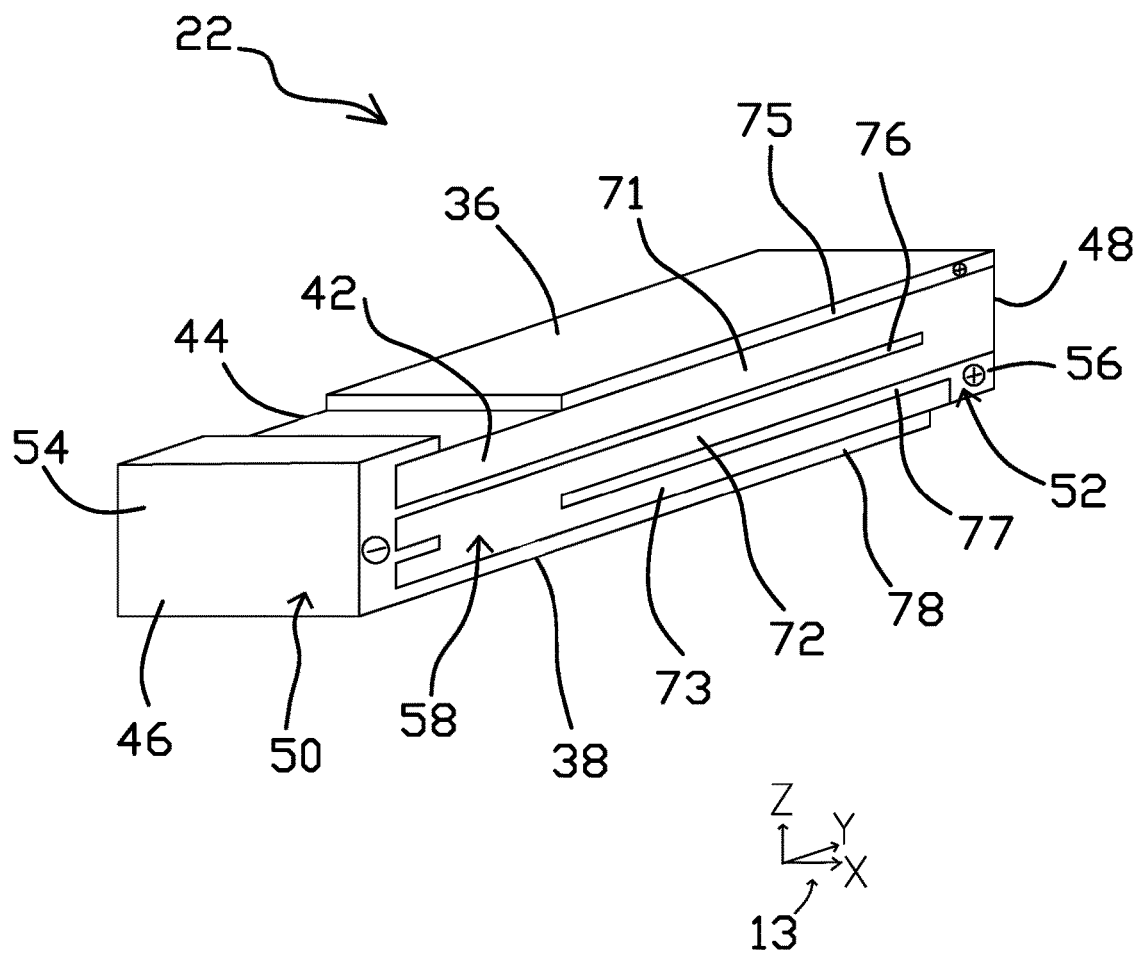
FIG. 6 is a detailed view of the motor of FIG. 3.
Figure 7:
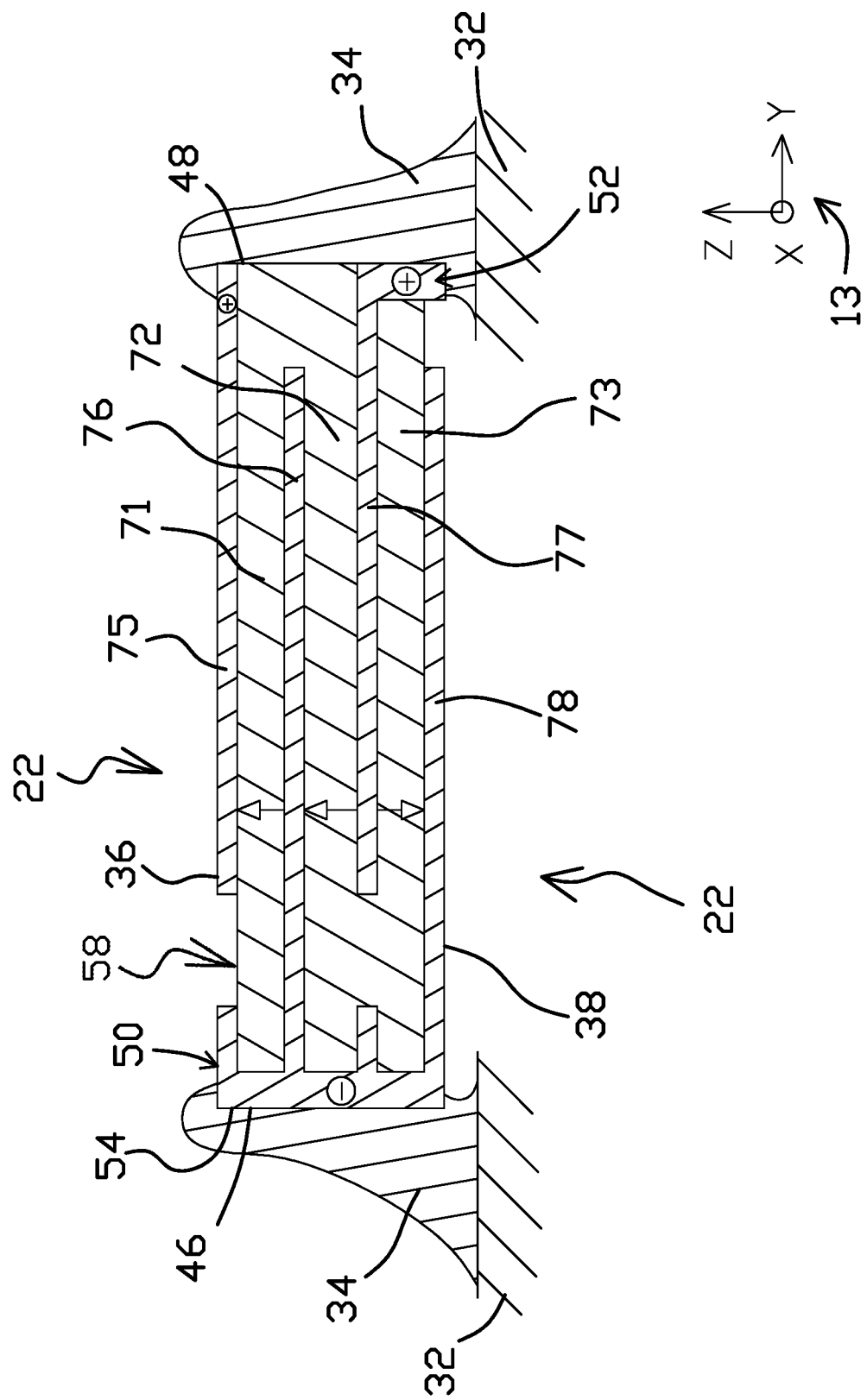
FIG. 7 is a cross sectional view of the motor of FIG. 3.

FIG. 6 is a detailed perspective view of the motor 22 and FIG. 7 is a cross-sectional view of the motor 22 which further shows connectors 34 and terminal pads 32. The motor 22 generally includes a top side 36, a bottom side 38 opposite the top side 36, a front side 42, a back side 44 opposite the front side 42, a first end side 46, and a second end side 48 opposite the first end side 46. The motor 22 includes a first terminal 50 and a second terminal 52. The first and second terminals 50, 52 can be formed from gold, copper, and/or other highly conductive material. The first terminal 50 includes a first end cap 54 which defines the first end side 46 of the motor 22. The first terminal 50 can further define a majority of the bottom side 38 as shown. The second terminal 52 includes a second end cap 56 which defines the second end side 48 of the motor 22. The second terminal 52 can include a first conductive layer 75, as further discussed herein. The first terminal 50 can be electrically connected to one side of a circuit of the flexure 4 while the second terminal 52 can be connected to the other side of the circuit, such that an electric potential can be applied across the motor 22, causing current to flow through the motor 22. The first terminal 50 is labeled as an anode while the second terminal 52 is labeled as a cathode for convenience. It will be understand that the first terminal 50 and the second terminal 52 can reversibly serve as either anode or cathode.

The motor 22 is comprised of multiple layers. The motor 22 includes a piezoelectric material 58. The piezoelectric material 58 can comprise lead titanate or various other materials that exhibit piezoelectric movement when subjected to an electric potential. The piezoelectric material 58 is divided into a plurality of piezoelectric material layers. The plurality of piezoelectric material layers includes a first actuator layer 71, a second actuator layer 72, and a third actuator layer 73. The plurality of piezoelectric layers are in a stacked (e.g., overlapping) arrangement. For example, the first actuator layer 71 is adjacent to the second actuator layer 72 and the second actuator layer 72 is adjacent to the third actuator layer 73. In some embodiments, the motor 22 can be limited to the first, second, and third actuator layers 71-73 and may not include any more actuator layers formed from piezoelectric material 58. Various other embodiments can include more than three actuator layers, such as four, five, or more actuator layers.

The motor 22 further comprises a plurality of conductive layers interleaved with the plurality of piezoelectric material layers. The plurality of conductive layers includes a first conductive layer 75 that defines the top side 36 of the motor 22. The plurality of conductive layers further comprises a second conductive layer 76, a third conductive layer 77, and a fourth conductive layer 78. The fourth conductive layer 78 defines the bottom side 38 of the motor 22. The top side of the first conductive layer 75 can be exposed on the top side 36 of the motor 22. In the arrangement of FIG. 6, the bottom side of the first conductive layer 75 is in contact with the top side of the first actuator layer 71. The bottom side of the first actuator layer 71 is in contact with the top side of the second conductive layer 76. The bottom side of the second conductive layer 76 is in contact with the top side of the second actuator layer 72. The bottom side of the second actuator layer 72 is in contact with the top side of the third conductive layer 77. The bottom side of the third conductive layer 77 is in contact with the top side of the third actuator layer 73. The bottom side of the third actuator layer 73 is in contact with the top side of the fourth conductive layer 78. The bottom side of the fourth conductive layer 78 can be exposed on the bottom side 38 of the motor 22.

In the embodiment of FIG. 6, the piezoelectric material 58 is continuous between the first, second, and third actuator layers 71-73. As shown, the first, second, and third actuator layers 71-73 form a serpentine shape around the second and third conductive layers 76, 77. In various other embodiments, such layers of the piezoelectric material 58 may not be in contact with each other and may be separated by one or more layers of non-piezoelectric material. In some embodiments, each of the plurality of actuator layers (e.g., first, second, and third actuator layers 71-73) are fabricated separately, including being poled, before being combined into the motor 22 as separate actuator layers. In this way, each actuator layer may be in contact with one or more other actuator layers in the motor 22, but the actuator layers may not be formed from a single piece of continuous piezoelectric material 58.

The plurality of conductive layers can be formed from conductive metal, such as gold or copper. The first terminal 50 can comprise the second and the fourth conductive layers 76, 78 as well as the first end cap 54. More specifically, the second and the fourth conductive layers 76, 78 can be connected to, or continuous with, the first end cap 54. The first and the third conductive layers 75, 77 are not directly connected (mechanically and electrically) to the first terminal 50. The second terminal 52 can comprise the first and the third conductive layers 75, 77 as well as the second end cap 56. While the first and third conductive layers 75, 77 are not directly connected to each other, these elements may be directly electrically connected to each other by the connector 34, such that a signal applied to the second terminal 52 is equally applied to each of the first and third conductive layers 75, 77. In alternative embodiments, the first and third conductive layers 75, 77 can be directly connected to each other by the second end cap 56 extending along the second end side 48, such as by being continuous with each of the first and the third conductive layers 75, 77, similarly to how the first end cap 54 is attached to the second and fourth conductive layers 76, 78. The second and the fourth conductive layers 76, 78 are not directly connected (mechanically and electrically) to the second terminal 52. The first terminal 50 is not directly electrically connected to the second terminal 52. A differential signal applied across the first and second terminals 50, 52 causes current to flow through the piezoelectric material 58. The first, second, and third actuator layers 71-73 are electrically in parallel between the first and second terminals 50, 52 such that, in some configurations, approximately equal electric potentials will be developed in the first, second, and third actuator layers 71-73 and approximately equal levels of current will flow through the first, second, and third actuator layers 71-73. The differential signal causes an electric potential to be developed between the first conductive layer 75 and the second conductive layer 76, thereby causing current to flow between the first conductive layer 75 and the second conductive layer 76, through the first actuator layer 71 therebetween. The differential signal causes an electric potential to be developed between the second conductive layer 76 and the third conductive layer 77 thereby causing current to flow between the second conductive layer 76 and the third conductive layer 77, through the second actuator layer 72 therebetween. The differential signal causes an electric potential to be developed between the third conductive layer 77 and the fourth conductive layer 78 thereby causing current to flow between the third conductive layer 77 and the fourth conductive layer 78, through the third actuator layer 73 therebetween. This flow of current through the piezoelectric material 58 causes the first, second, and third actuator layers 71-73 to expand and contract, as further discussed herein.

The piezoelectric material 58 does not expand or contract in all dimensions equally upon application of the electrical signal. Rather, each layer of the first, second, and third actuator layers 71-73 has a particular dipole direction of the crystalline structure, the polarization of the signal and the dipole direction determining whether each actuator layer expands or contracts, as further discussed herein.

The piezoelectric material 58 has a crystalline structure which causes the material to change dimension most dramatically along one direction upon application of a differential signal across the first and second terminals 50, 52. Each cell of the crystalline structure functions as a dipole due to a charge imbalance across the cell. The orientations of the dipoles of the cells are generally random in untreated piezoelectric material 58. However, a processing step, called poling, can be performed on the piezoelectric material 58 during fabrication of the motor 22 to pole the dipoles in one desired orientation. During poling, untreated piezoelectric material 58 is subjected to a strong electric field that permanently reorientates most or all dipoles of the cells in a general or specific direction of the field. The process of poling can be performed layer-by-layer such that each of the first, second, and third actuator layers 71-73 (and other layers as provided) can be poled in a particular direction which may not be the same direction as the poling direction of the other layers. The direction along which the dipoles of a layer generally align is the poling direction. After the process of poling is complete, subsequent application of a differential signal (e.g., having a substantially lower strength than the electrical field used to pole the layers) causes more of the dipoles to reorientate along the poling direction and/or to causes the dipoles to more precisely align along the poling direction.

As such, each of the first, second, and third actuator layers 71-73 can have a similar or different dipole orientation with respect to the other layers. The poling direction, and the polarity of the signal across the layer relative to the poling direction, determines whether the layer expands or contracts in response to the differential signal. The arrows of FIG. 7 are used to indicate the relative poling of the first, second, and third actuator layers 71-73. It is noted that the directions of the arrows are used for convenience to distinguish the layers as having similar or different poling directions. The arrows themselves do not necessarily indicate the direction of dipole orientation. In some embodiments, the actual dipole orientation may extend along the longitudinal axis of each layer, (i.e. laterally).

As indicated by the arrows, the first and second actuator layers 71, 72 are poled in the same direction while the third actuator layer 73 is poled in a different direction (e.g., opposite the poling direction of the first and second actuator layers 71, 72). In this way, the dipole orientations of the crystalline structure of the first and second actuator layers 71, 72, are the same, which is in a different direction as the dipole orientation of the crystalline structure of the third actuator layer 73.

Figure 8:
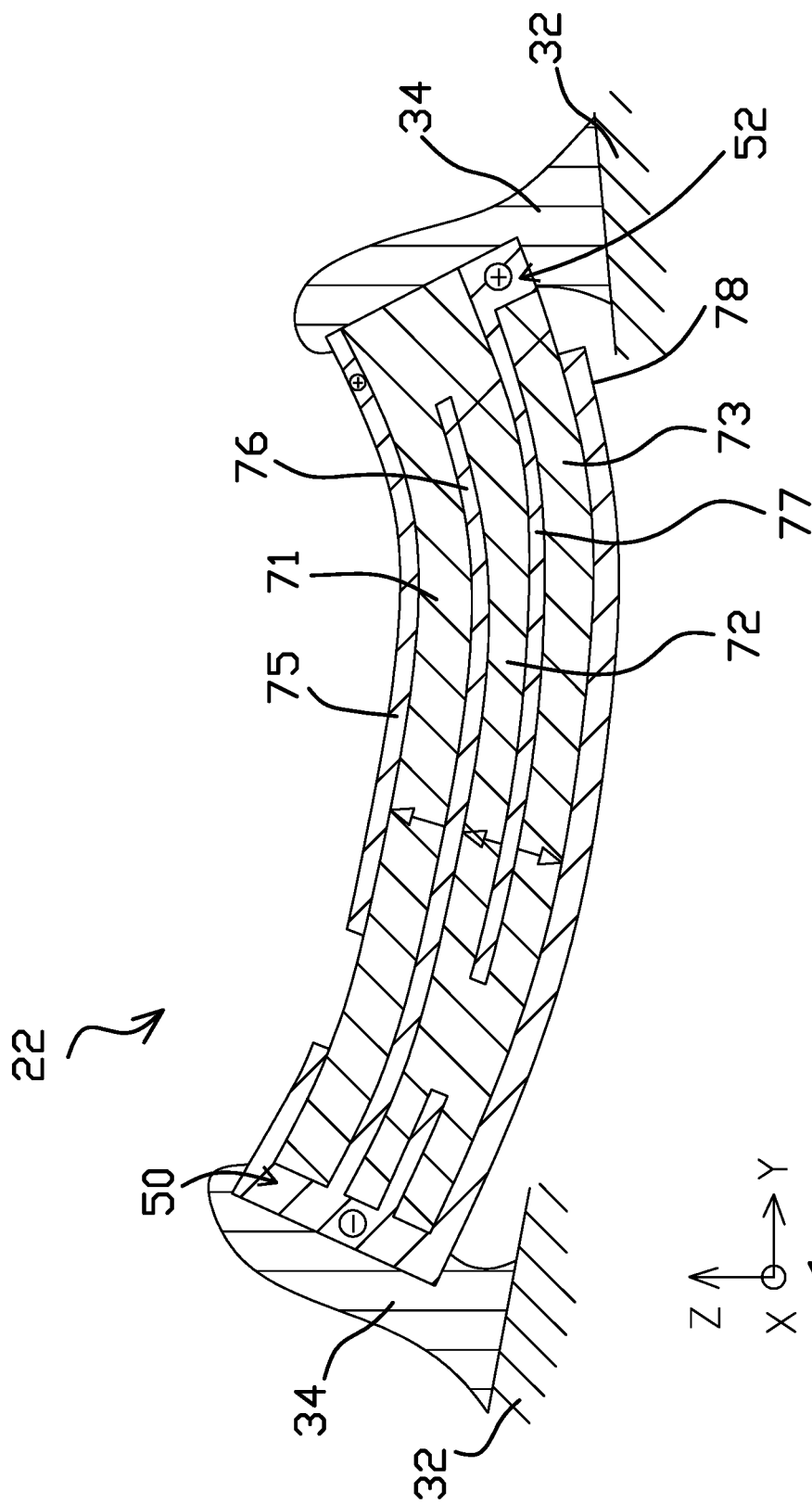
FIG. 8 shows the same cross sectional view of FIG. 7 but while the motor is activated to generally expand laterally.

The relative poling of the first, second, and third actuator layers 71-73, and the arrangement of the first, second, third, and fourth conductive layers 75-78 alternatingly connecting to the first and second terminals 50, 52, causes the motor 22 to curl, as shown in FIG. 8. FIG. 8 is the same cross-sectional view as shown in FIG. 7, but during electrical activation of the motor 22. The first and second actuator layers 71, 72 are adjacent to one another, while the third actuator layer 73 is adjacent to the second actuator layer 72 and is poled in a different direction than the first and second actuator layers 71, 72. Furthermore, the plurality of conductive layers 75-78 alternate in polarity such that when a differential signal is applied across the motor 22, each of the first and second actuator layers 71, 72 will experience the signal at different polarities with respect to their poled orientations (even though both of the first and second actuator layers 71, 72 are poled in the same direction). The result is that one of the first and second actuator layers 71, 72 expand while the other of the first and second actuator layers 71, 72 will contract in response to the same signal applied across the motor 22. In the specific example of FIG. 8, the second actuator layer 72 expands while first actuator layer 71 contracts. Because of the reverse poling of the third actuator layer 73 with respect to the first and second actuator layers 71, 72, the third actuator layer 73 expands or contracts together with the second actuator layer 72, thus doing the opposite (i.e. expanding or contracting) of the first actuator layer 71. As shown in the example of FIG. 8, the third actuator layer 73 expands.

The second and third actuator layers 72, 73, will expand or contract together while the first actuator layer 71 will the other of expand or contract in synchrony with the second and third actuator layers 72, 73. More broadly, a pair of adjacent actuator layers will expand or contract together while an additional actuator layer, that is adjacent to one layer of the pair, will the other of expand or contract in opposite synchrony with the pair of adjacent actuator layers. The pair of adjacent second and third actuator layers 72, 73 expanding or contracting together drives the general longitudinal expansion or contraction of the motor 22, and thereby the deflection of the tongue 20 and slider 18. The expansion or contraction of the first actuator layer 71, opposite the motion of the pair of adjacent second and third actuator layers 72, 73, causes a disparity in motion within the motor 22. As shown in FIG. 8, the first actuator layer 71 is contracting which causes the expanding second and third actuator layers 72, 73 to partially curl around the first actuator layer 71. The layers of the motor are attached to one another as a whole such that the motor 22 curls to accommodate the disparity in motion, thereby causing the curling motion shown in FIGS. 4 and 8.

Figure 9:
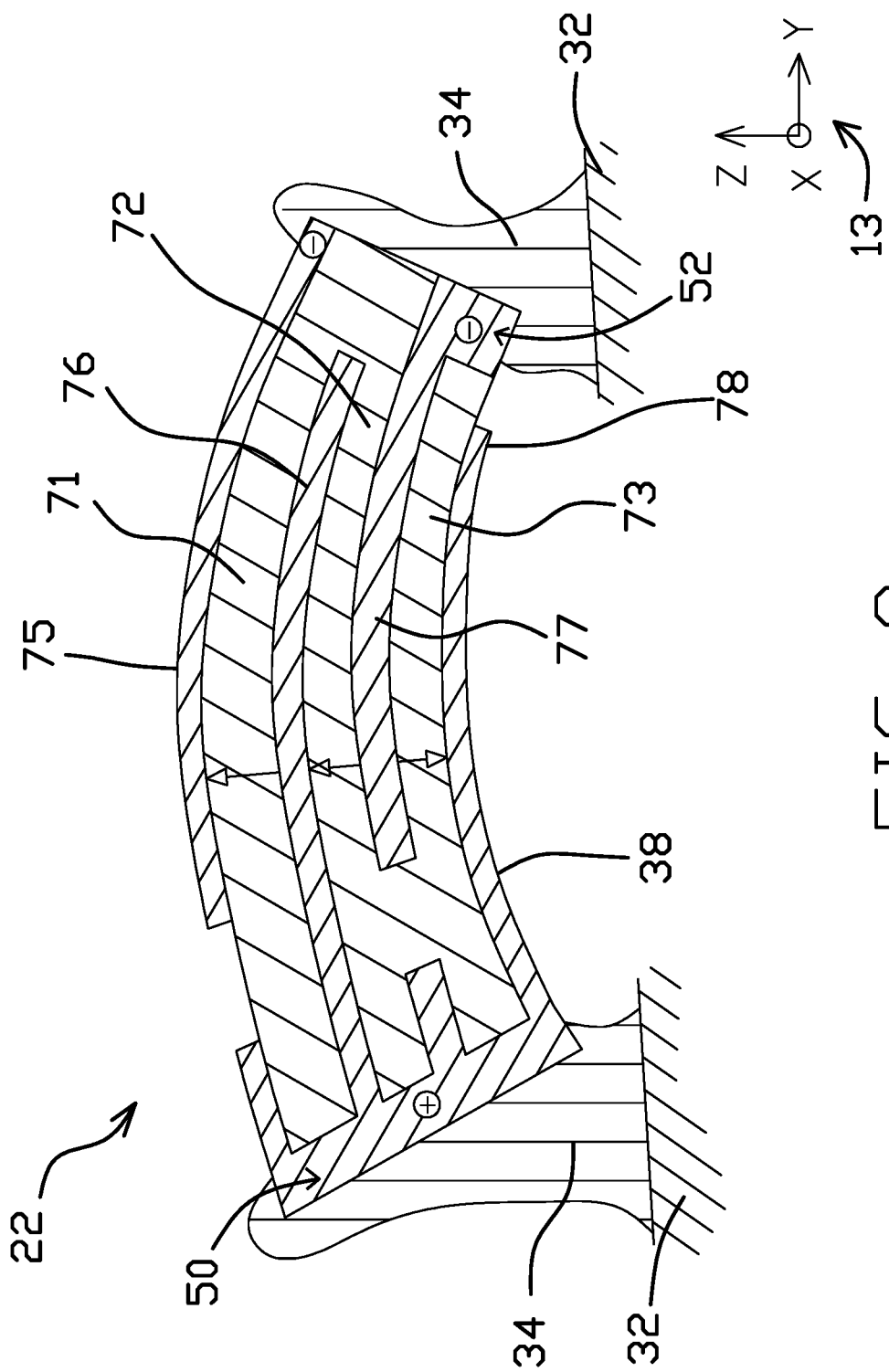
FIG. 9 shows the same cross sectional view of FIG. 7 but while the motor is activated to generally contract laterally.

FIG. 9 is the same cross-sectional view as FIG. 8 but with the differential signal applied to the motor 22 being reversed in polarity. The polarity indicators on the first and second terminals 50, 52 are reversed relative to FIG. 8 to indicate the reversal of signal polarity. As shown in the example of FIG. 9, the first and second actuator layers 71, 72 contract laterally (e.g., along the Y-axis) while the third actuator layer 73 expands laterally, simultaneously. This disparity in lateral motion causes the expanding first actuator layer 71 to curl around the contracting second and third actuator layers 72, 73. This disparity in motion causes the motor 22 to curl as shown in FIG. 5.

It is noted that the poling directions of the first, second, and third actuator layers 71-73 are examples, and that other poling directions can be used for the various layers. For example, the poling directions of the first, second, and third actuator layers 71-73 can be reversed relative to what is shown in FIGS. 7-9. Some embodiments may correspond to the dipole orientations shown herein, but the motor 22 may be flipped. Other options are also possible.

In performance testing conducted by the inventors, a three layer motor similar to that shown in FIGS. 6-9 exhibited superior stoke performance relative to a standard five layer motor in which all layers were poled to expand or contract together. More specifically, the three layer motor was tested to have a 33.5 nanometer/volt stroke while the standard five layer motor was tested to have a 13.6 nanometer/volt stroke. Therefore, higher stroke performance can be achieved while using fewer actuator layers.

While three layer motors have been demonstrated herein in various embodiments, it is noted that various other embodiments can include a greater number of layers. Such motors can still exhibit the differential expanding/contracting motion as well as a greater number of expanding or contracting layers (e.g., three expanding layers and one or two contracting layers, which can be reversed to three contracting layers and one or two expanding layers). Furthermore, such motors can also include a pair of actuator layers that are adjacent to one another and that expand or contract together while another actuator layer, adjacent to one layer of the pair of actuator layers, expands while the pair of actuator layers contracts. For example, a top actuation layer can be added to the embodiment of FIG. 6 to extend above, and adjacent to, the first actuator layer 71 (e.g., in contact with the top side of the first conductive layer 75) A top conductive layer can then be added along the top side of the added top actuation layer in a similar manner to the first conductive layer 75. The top actuator layer can be poled in the same direction as the first actuator layer 71 or poled in the opposite direction. Instead of one top actuator layer being added, two top actuator layers may be added above the first actuator layer 71. Alternatively or additionally, one or two bottom actuator layers may be added to extend below, and adjacent to, the third actuator layer 73. Similar top and/or bottom actuators layers can be added to the motor 122 of FIGS. 10-11. For example, fourth and fifth actuator layers (not illustrated) can be added between the top and bottom conductive layers 175, 178, the fourth and fifth actuator layers stacked together with the first, second, and third actuator layers 171-173. The fourth and fifth actuator layers can both be above or below the first, second, and third actuator layers 171-173, or can be respectively above and below the first, second, and third actuator layers 171-173.

Figure 10:
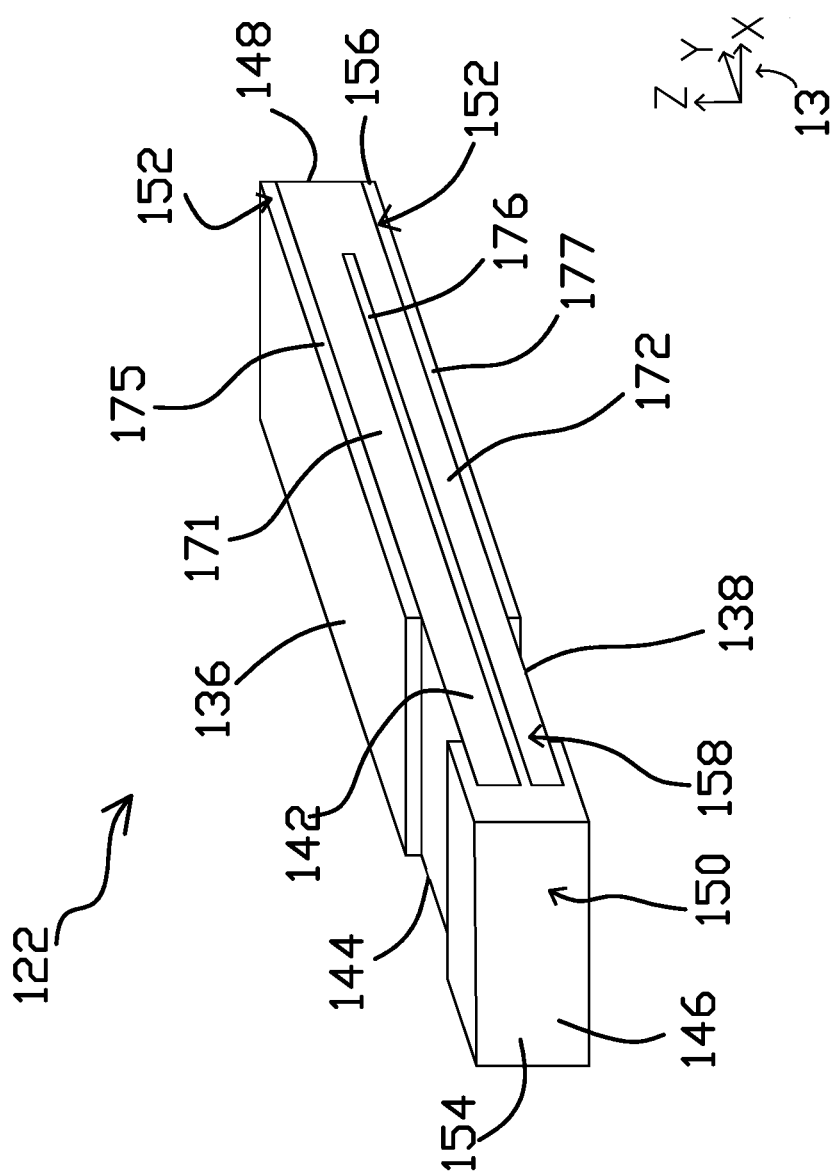
FIG. 10 is a detailed view of a motor.
Figure 11:
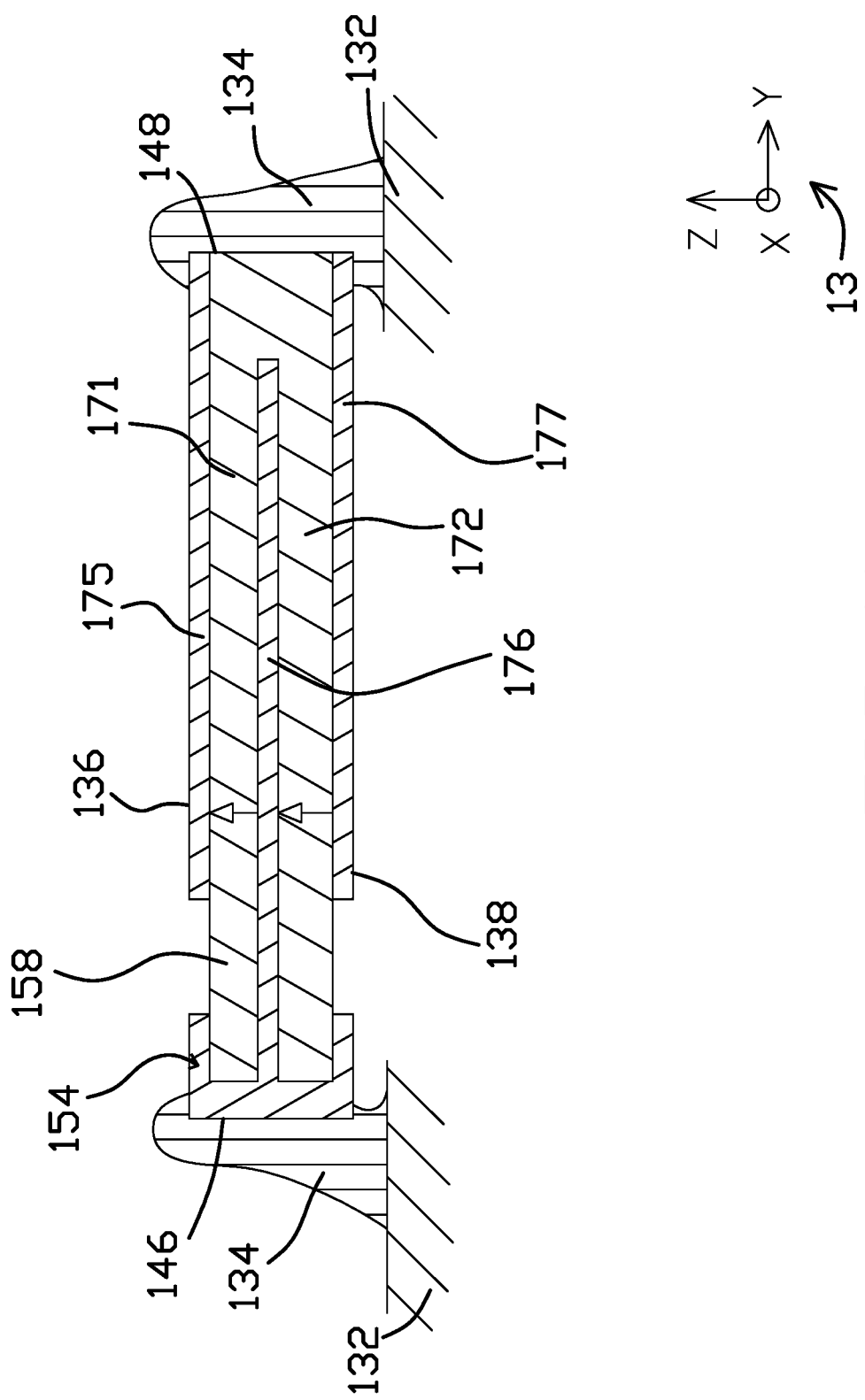
FIG. 11 is a cross sectional view of the motor of FIG. 10.

FIG. 10 is a detailed perspective view of a motor 122 having an alternative configuration. The motor 122 can be mounted on various flexures, such as that shown in FIGS. 1-5 or any other flexure referenced herein. The motor 122 can be fabricated and used in any manner referenced herein except where otherwise noted. FIG. 11 is a cross-sectional view of the motor 122 of FIG. 10. FIG. 11 further shows connectors 134 which can be used to electrically and mechanically connect the motor 122 to terminal pads 132 as disclosed herein. The motor 122 generally includes a top side 136, a bottom side 138 opposite the top side 136, a front side 142, a back side 144 opposite the front side 142, a first end side 146, and a second end side 148 opposite the first end side 146. The motor 122 includes a first terminal 150 and a second terminal 152. The first terminal 150 defines the first end side 146. The second terminal 152 defines part of the second end side 148. The second terminal 152 is comprised of a top conductive layer 175 and a bottom conductive layer 177. The top and bottom conductive layers 175, 177 may not contact each other, but as shown in FIG. 11, a connector 134 can contact each of the top and bottom conductive layers 175, 177 and electrically connect the top and bottom conductive layers 175, 177 such that they function as though they are directly electrically connected. Therefore, a signal applied to the bottom conductive layer 177 will freely conduct through the connector 134 to the top conductive layer 175 with negligible or no loss.

The first terminal 150 can be electrically connected to one side of a circuit of a flexure while the second terminal 152 can be connected to the other side of the circuit, such that an electrical potential can be applied across the motor 122, causing current to flow through the motor 122. It will be understood that the first terminal 150 and the second terminal 152 can each reversibly serve as either an anode or a cathode.

The motor 122 includes piezoelectric material 158. The piezoelectric material 158 can be similar to any piezoelectric material referenced herein. The piezoelectric material 158 includes only two piezoelectric layers. The piezoelectric material 158 includes a top actuator layer 171 and a bottom actuator layer 172. The motor 122 does not include any other piezoelectric layers. It is noted that the first and second actuator layers 171, 172 can be considered first and second actuator layers, respectively.

The motor 122 comprises a plurality of conductive layers. The plurality of conductive layers comprise a top conductive layer 175, a middle conductive layer 176, and a bottom conductive layer 177. The top conductive layer 175, the middle conductive layer 176, and the bottom conductive layer 177 can be considered first, second, and third conductive layers, respectively. The top conductive layer 175 defines the top side 136 of the motor 122. The bottom conductive layer 177 defines the bottom side 138 of the motor 122. The middle conductive layer 176 is sandwiched between the first and second actuator layers 171, 172. The top, middle, and bottom conductive layers 175-177 are in a stacked and interleaved arrangement with the first and second actuator layers 171, 172. A top side of the top conductive layer 175 can be exposed on the top side 136 of the motor 122. The bottom side of the top conductive layer 175 contacts the top side of the top actuator layer 171. A bottom side of the top actuator layer 171 contacts a top side of the middle conductive layer 176. A bottom side of the middle conductive layer 176 contacts a top side of the bottom actuator layer 172. A bottom side of the bottom actuator layer 172 contacts a top side of the bottom conductive layer 177. A bottom side of the bottom conductive layer 177 can be exposed on the bottom side 138 of the motor 122. The top, middle, and bottom conductive layers 175-177 can be similar to any conductive layer discussed herein, such as by being formed from a metal such as copper or gold. The first terminal 150 can be directly connected, or continuous, with the middle conductive layer 176.

As shown in FIG. 11, the first and second actuator layers 171, 172 are poled in the same direction. The piezoelectric material 158 is continuous between the first and second actuator layers 171, 172. As shown, the first and second actuator layers 171, 172 form a U shape and wrap around the middle conductive layers 176. In various other embodiments, the first and second actuator layers 171, 172 may not be in contact with each other and may be separated by one or more layers of non-piezoelectric material.

The arrows of FIG. 11 indicate the relative poling of the first and second actuator layers 171, 172 in similar manner to the arrows in FIG. 7. The first terminal 150 is not directly electrically connected to the second terminal 152. A differential signal applied across the first and second terminals 150, 152 causes current to flow through the piezoelectric material 158. The first and second actuator layers 171, 172 are electrically in parallel between the first and second terminals 150, 152 such that, in some configurations, approximately equal electric potentials will be developed in the first and second actuator layers 171, 172 and approximately equal levels of current will flow through the first and second actuator layers 171, 172. The differential signal causes an electric potential to be developed between the top conductive layer 175 and the middle conductive layer 176, thereby causing current to flow between the top conductive layer 175 and the middle conductive layer 176, through the top actuator layer 171 therebetween. The differential signal causes an electric potential to be developed between the middle conductive layer 176 and the bottom conductive layer 177 thereby causing current to flow between the middle conductive layer 176 and the bottom conductive layer 177, through the second actuator layer 72 therebetween. This flow of current through the piezoelectric material 158 causes the first and second actuator layers 171, 172 to expand and contract, as further discussed herein.

The poling of the first and second actuator layers 171, 172, and the arrangement of the top, middle, and bottom conductive layers 175-177 alternatingly connecting to the first and second terminals 150, 152, causes the motor 122 to curl upon activation. The first and second actuator layers 171, 172 are adjacent to one another while the top, middle, and bottom conductive layers 175-177 alternate in polarity such that when a differential signal is applied across the motor 122, each of the first and second actuator layers 171, 172 will experience the signal at different polarities with respect to their poled orientations (even though both of the first and second actuator layers 171, 172 are poled in the same direction). The result is that one of the first and second actuator layers 171, 172 expand while the other of the first and second actuator layers 171, 172 will contract in response to the same signal applied across the motor 122. Reversal of the signal polarity will likewise cause the expansion and contraction movements of the first and second actuator layers 171, 172 to reverse. Therefore, the only two actuator layers of the motor 122 will oppositely expand and contract in synchrony upon electrical activation. The expanding actuator layer will have a tendency to curl around the contracting actuator layer, as demonstrated herein in other embodiments.

In an alternative configuration of the embodiment of FIGS. 10 and 11, the middle conductive layer 176 may be removed, the poling direction of one of the first or second actuator layers 171, 172 may be reversed, and the first and second actuator layers 171, 172 can be electrically connected in series. Such an arrangement is similar to that shown in FIGS. 10 and 11 except that the motor only includes two actuator layers of opposite poling direction that oppositely expand and contract in synchrony upon electrical activation.

Although the present invention has been described with reference to preferred embodiments, those skilled in the art will recognize that changes can be made in form and detail without departing from the spirit and scope of the invention. For example, although described in connection with certain co-located DSA structures, motors and associated features described herein can be used in connection with other DSA structures, including other co-located DSA structures and/or non-co-located DSA structures, such as with baseplate 6 or loadbeam 8 mounted motors.

The following is claimed:

1. A motor for a suspension structure, comprising:
   at least a first poled piezoelectric material actuator layer and a second poled piezoelectric material actuator layer positioned between a first end terminal and a second end terminal, the first end terminal and the second end terminal are configured to connect with a first connector and a second connector, respectively, to mount to the suspension structure;
   a first conductive layer extending from the second connector, a third conductive layer extending from the second terminal, and a second conductive layer and a fourth conductive layer extending from the first terminal, the first and third conductive layers are not directly connected to each other, each of the conductive layers disposed on at least one of the actuator layers, the conductive layers configured to be electrically connected to one or more electrical traces on the suspension structure; and
   the poled actuator layers and conductive layers are configured such that the application of a first polarity drive signal causes the motor to curl in a first direction and the application of a second polarity drive signal causes the motor to curl in a second direction.

2. The motor of claim 1, wherein the first connector and second connector are further configured to mount the actuator layers to a flexure of the suspension structure and to electrically connect the conductive layers to the one or more electrical traces on the suspension structure.

3. The motor of claim 1, wherein the first terminal and the second terminal are formed of copper.

4. The motor of claim 1, wherein the first end terminal and the second end terminal include gold.

5. The motor of claim 1, wherein the first end terminal includes a first end cap on a first end side of the motor.

6. The motor of claim 5, wherein the first conductive layer is configured to form a majority of a bottom side of the motor.

7. The motor of claim 1, wherein the second terminal includes a second end cap on a second end side of the motor.

8. The motor of claim 1, wherein the first poled piezoelectric material actuator layer is poled in an alternate polarity than the second poled piezoelectric material actuator layer.

9. The motor of claim 1, wherein the first poled piezoelectric material actuator layer, the second poled piezoelectric material actuator layer, and the conductive layers are configured such that the motor has at least a 33.5 nanometer per volt stroke.

10. The motor of claim 8 including at least a third poled piezoelectric material actuator layer is poled in a same polarity as the second poled piezoelectric material actuator layer.

11. A motor for a flexure, comprising:
   at least a first poled piezoelectric material actuator layer and a second poled piezoelectric material actuator layer positioned between a first end terminal and a second end terminal, the first end terminal and the second end terminal are configured to connect with a first connector and second connector, respectively, to mount to the flexure;
   a first conductive layer extending from the second connector, a third conductive layer extending from the second terminal, and a second conductive layer and a fourth conductive layer extending from the first terminal, the first and third conductive layers are not directly connected to each other, each of the conductive layers disposed on at least one of the actuator layers, the conductive layers configured to be electrically connected to one or more electrical traces on the flexure; and
   the poled actuator layers and conductive layers are configured such that the application of a first polarity drive signal causes the motor to curl in a first direction and the application of a second polarity drive signal causes the motor to curl in a second direction.

12. The motor of claim 11, wherein the first and second connectors are further configured to mount the actuator layers to the flexure and to electrically connect the conductive layers to the one or more electrical traces on the flexure.

13. The motor of claim 11, wherein the first end terminal includes a first end cap on a first end side of the motor.

14. The motor of claim 13, wherein the first conductive layer is configured to form a majority of a bottom side of the motor.

15. The motor of claim 11, wherein the second end terminal includes a second end cap on a second end side of the motor.

16. The motor of claim 11, wherein the first poled piezoelectric material actuator layer is poled in an alternate polarity than the second poled piezoelectric material actuator layer.

17. The motor of claim 11, wherein the first poled piezoelectric material actuator layer, the second poled piezoelectric material actuator layer, and the conductive layers are configured such that the motor has at least a 33.5 nanometer per volt stroke.

18. The motor of claim 16 including at least a third poled piezoelectric material actuator layer is poled in a same polarity as the second poled piezoelectric material actuator layer.

* * * * *